US012044091B2

(12) United States Patent
Manning et al.

(10) Patent No.: US 12,044,091 B2
(45) Date of Patent: Jul. 23, 2024

(54) PISTON ACTUATED VALVE APPARATUS

(71) Applicant: Unity Well Integrity Limited, Aberdeen (GB)

(72) Inventors: Matthew Manning, Aberdeen (GB); Jason Duthie, Aberdeen (GB)

(73) Assignee: Unity Well Integrity Limited, Aberdeen (GB)

( * ) Notice: Subject to any disclaimer, the term of this patent is extended or adjusted under 35 U.S.C. 154(b) by 0 days.

(21) Appl. No.: 17/797,180

(22) PCT Filed: Feb. 5, 2021

(86) PCT No.: PCT/EP2021/052867
§ 371 (c)(1),
(2) Date: Aug. 3, 2022

(87) PCT Pub. No.: WO2021/156476
PCT Pub. Date: Aug. 12, 2021

(65) Prior Publication Data
US 2023/0051577 A1  Feb. 16, 2023

(30) Foreign Application Priority Data
Feb. 5, 2020  (GB) .................................... 2001561

(51) Int. Cl.
*E21B 33/06* (2006.01)
*E21B 34/02* (2006.01)
(Continued)

(52) U.S. Cl.
CPC ............ *E21B 33/063* (2013.01); *E21B 34/02* (2013.01); *F16K 3/02* (2013.01); *F16K 3/314* (2013.01);
(Continued)

(58) Field of Classification Search
CPC ...... E03B 33/06; E03B 33/061; E03B 33/062; E03B 33/063; E03B 33/064; F16K 3/02; F16K 3/14; F16K 31/1221; F16K 31/1225
(Continued)

(56) References Cited

U.S. PATENT DOCUMENTS 3,610,569 A * 10/1971 Reaves ............... F16K 31/1225
251/52
4,730,806 A * 3/1988 Krasnov ............... F16K 3/0254
251/63
(Continued)

FOREIGN PATENT DOCUMENTS

CN       107387789 B    5/2019
WO   WO-2019/203830 A1  10/2019

OTHER PUBLICATIONS

International Preliminary Report on Patentability issued in corresponding international patent application No. PCT/EP2021/052867 dated Aug. 18, 2022.
(Continued)

*Primary Examiner* — Daphne M Barry
(74) *Attorney, Agent, or Firm* — Harness, Dickey & Pierce, P L C

(57) ABSTRACT

A valve apparatus comprises a valve body defining a flow path therethrough, a valve member mounted within the valve body, and an actuator assembly mounted internally within the valve body. The actuator assembly comprises a piston bore and piston member defining a piston chamber therebetween, wherein at least one of the piston bore and piston member is engaged or associated with the valve member such that the valve member is moveable in accordance with fluid pressure within the piston chamber to selectively occlude the flow path.

14 Claims, 11 Drawing Sheets

(51) Int. Cl.
    *F16K 3/02*      (2006.01)
    *F16K 3/314*     (2006.01)
    *F16K 31/122*    (2006.01)
(52) U.S. Cl.
    CPC ...... *F16K 31/1221* (2013.01); *F16K 31/1225* (2013.01)
(58) Field of Classification Search
    USPC .......................................................... 251/1.3
    See application file for complete search history.

(56) References Cited

U.S. PATENT DOCUMENTS

| | | | |
|---|---|---|---|
| 5,931,442 A | 8/1999 | Cummins | |
| 7,374,146 B2 * | 5/2008 | Whitby | E21B 33/062 166/85.4 |
| 2014/0197345 A1 | 7/2014 | Graichen et al. | |
| 2017/0107779 A1 * | 4/2017 | Akhare | E21B 33/063 |

OTHER PUBLICATIONS

International Search Report and Written Opinion for International Application No. PCT/EP2021/052867 dated Mar. 29, 2021.
Intellectual Property Office Search Report for Patent Application No. GB2001561.6 dated Nov. 17, 2020.

* cited by examiner

PISTON ACTUATED VALVE APPARATUS

CROSS-REFERENCE TO RELATED APPLICATIONS

This application is a national phase under 35 U.S.C. § 371 of PCT International Application No. PCT/EP2021/052867 which has an International filing date of Feb. 5, 2021, which claims priority to United Kingdom Application No. 2001561.6, filed Feb. 5, 2020, the entire contents of each of which are hereby incorporated by reference.

FIELD

The present disclosure relates to a valve apparatus.

BACKGROUND

Many industries utilise valves for controlling flow in fluid systems. For example, valves have numerous applications in the oil and gas exploration and production industry, such as might be associated with the control of fluid to and/or from a wellbore.

In many circumstances the size of a valve is an important consideration, and providing a compact valve design is often desirable, particularly without necessarily compromising on flow capacity, pressure rating, valve actuation force and/or the like. Furthermore, the mode of actuation is also an important design consideration. In known valve designs a valve actuator will typically include a valve interface, such as a piston rod, which extends into a valve body pressure housing to engage and operate a valve member. Providing appropriate sealing integrity around the valve actuator can often be difficult and defines a further failure mode.

SUMMARY

An aspect of the present disclosure relates to a valve apparatus, comprising:
  a valve body defining a flow path therethrough;
  a valve member mounted within the valve body; and
  an actuator assembly mounted internally within the valve body and comprising a piston bore and piston member defining a piston chamber therebetween, wherein at least one of the piston bore and piston member is engaged or associated with the valve member such that the valve member is moveable in accordance with fluid pressure within the piston chamber to selectively occlude the flow path.

The valve member is thus fluid actuated by fluid pressure within the piston chamber of the actuator assembly. In some examples the valve member may be hydraulically operated. In other examples the valve member may be pneumatically operated.

The actuator assembly by being located internally within the valve body may thus be defined as an internal actuator assembly. This may minimise the requirement for external actuators which may provide benefits in terms of avoiding complexities of facilitating sealing around actuator components, such as piston rods and the like. Furthermore, internalising the actuator assembly may lead to benefits in terms of space savings. Also, providing an internal actuator may facilitate fewer parts, thus with less complexity, and potential cost and weight savings. Reduced complexity may also facilitate simpler manufacture, servicing, re-dressing and the like.

The valve body may define a valve cavity which intersects the flow path, wherein the valve member is located and moveable within the valve cavity. The actuator assembly may also be located within the valve cavity. The valve member may be moveable within the valve cavity under operation of the actuator assembly to selectively occlude the flow path.

The valve member may be moveable between an open position in which the valve member presents a minimal occlusion to the flow path, and a closed position in which the valve member presents a maximum occlusion to the flow path. The valve member may be controllable to be located in any position between its open and closed positions.

In some examples the valve member may present substantially zero occlusion to the flow path when said valve member is in its open position. Alternatively, the valve member may partially occlude to the flow path when said valve member is in its open position.

The valve member may fully occlude the flow path when said valve member is in its closed position. Alternatively, the valve member, when in its closed position, may partially occlude the flow path. Such partial occlusion may suit desired operations or functions, such as providing a choking effect to flow along the flow path, providing an engageable profile along the flow path, engaging an object internally of the flow path, (for example, grippingly engaging, sealingly engaging, shearingly engaging etc.) and/or the like. In some examples the valve member may cooperate with a further valve member to provide partial or complete occlusion of the flow path, which will be described in more detail below.

The valve member may be arranged for linear operation within the valve apparatus (for example, within the valve cavity). The valve member may be arranged to be linearly extended and retracted relative to the flow path to thus selectively occlude the flow path. The valve member may be linearly moveable in a transverse direction relative to the flow path to selectively occlude the flow path.

The actuator assembly may comprise a linear actuator assembly. For example, the piston bore and the piston member may be configured to move linearly relative to each other, such that the piston bore and piston member may define a telescoping assembly. The actuator assembly and the valve member may be arranged for common linear movement, avoiding the requirement for any movement translation mechanisms and thus minimising complexity.

The valve member may function as or define the piston member, and as such may also be defined as a piston valve member. The valve member may form an integral part of the actuator assembly.

The valve member may define the piston bore. The piston bore may extend into the valve member, for example along a longitudinal length of the valve member. The piston bore may be located within the valve member. The piston bore may comprise a circular cross section. The piston bore may extend along approximately half of the longitudinal length of the valve member. Alternatively, the piston bore may extend along less or more than half of the length of the valve member. In one example, the piston bore may extend along a 60%-90% of the longitudinal length of the valve member. The length of the piston bore may be determined in accordance with the requirements of the application of the valve apparatus, for example to provide a particular length of piston chamber to enable a required stroke length of the valve member and/or to provide desired structural properties of the valve member.

The valve member may comprise a proximal section and a distal section, the proximal section being arranged closer to the flow path than the distal section. The proximal section may be configured to receive or connect with an insert or other component, e.g. configured to selectively occlude the flow path.

The distal section of the valve member may comprise the piston bore. The piston bore may extend into the valve member from the distal end of the valve member. The piston bore may have an open (distal) end configured to receive the piston member.

The piston member may extend into the piston bore to define the piston chamber therein. As such, the piston chamber may be located within the valve member.

The piston member may be fixed with respect to the valve body. For example, the piston member may be affixed or affixed relative to a cover plate or bonnet of the valve body. The valve member may be moveable with respect to the piston member, to move between retracted and extended positions within the valve body to selectively occlude the flow path.

The piston member may comprise a piston rod. The piston member may define a piston head. The piston head may comprise an enlarged diameter with respect to the piston rod. Thus, the piston member may define an enlarged piston head. In another example, the piston rod and piston head may have the same diameter.

The piston bore may comprise a closed (proximal) end surface of the piston chamber, i.e. a cylinder head surface. As such, the proximal end of the valve member may define or function as a cylinder head.

Moreover, it will be appreciated that the piston member is fixed relative to the valve body, therefore the cylinder head (i.e. the valve member) will move relative to the valve body while the piston member remains stationary.

The piston member and valve member may define the piston chamber, which together may function as an actuator assembly. It will be appreciated that in this configuration the piston chamber may be located within the valve member and therefore the valve member may be considered as comprising the cylinder head associated with the piston chamber, forming an integral part of an internal actuator assembly, thereby obviating the need to provide an external actuator (e.g. a separate piston cylinder assembly) and thus providing for a compact valve design. The valve apparatus may be considered as a single-acting valve apparatus (i.e. capable of acting in a single direction).

The piston rod of the piston member may have a first (distal) end affixed or affixed relative to the valve body, for example the bonnet or cover plate of the valve body. The piston rod may have a second (proximal) end received within the piston bore. The enlarged piston head may be located at the proximal end of the piston rod.

The piston rod may include a passageway permitting fluid communication between a control line and the piston chamber. The piston chamber may be configured such that when supplied with fluid pressure, the valve member may be biased towards one of an extended and retracted position to selectively occlude the flow path.

The valve member may be configured such that it may be biased towards the other of the extended and retracted position, i.e. in an opposite direction. For example, the valve member may be provided with a biasing member, such as a spring, and/or the valve member may be configured to be biased by virtue of fluid pressure in the flow path and/or the valve body.

Alternatively, the valve member may be configured to be operated between extended and retracted positions by virtue of fluid pressure delivered to a second piston chamber.

For example, a cylinder (end) cap may be disposed in the open (distal) end of the piston bore. The piston rod may extend through the cylinder end cap. The cylinder end cap may be a separate component from the valve member. The cylinder end cap may be integrally formed with the valve member.

The enlarged piston head of the piston member may divide the piston bore into first and second piston chambers. Such a configuration may provide for a compact valve design while permitting the valve member to be operated between extended and retracted positions by virtue of fluid pressure delivered to the first and second piston chambers within the valve member. In this example, the piston chamber described above may define the first piston chamber. Such a valve apparatus may be considered as a double-acting valve apparatus (i.e. capable of acting in two direction).

The cylinder end cap may be fixed relative to the valve member. The cylinder end cap may sealingly engage the valve member (e.g. the piston bore of the valve member).

The cylinder end cap may have a bore through which the piston rod may sealingly extend. The enlarged piston head of the piston rod, received within the piston bore, may comprise a size corresponding to that of the piston bore. The piston head may sealingly engage the piston bore.

The piston head may define a first (proximal facing) piston head surface associated with the first piston chamber and an opposing second (distal facing) piston head surface associated with the second piston chamber. An internal (closed) surface of the piston bore within the valve member may define a first cylinder head surface associated with the first piston chamber. A proximal facing surface of the cylinder end cap may define a second cylinder head surface associated with the second piston chamber.

The first piston chamber may be configured such that when supplied with fluid pressure the valve member may be biased towards an extended position. The second piston chamber may be configured such that when supplied with fluid pressure the valve member may be biased towards a retracted position.

The piston member may include one or more passageways permitting fluid communication between control lines and the first and second piston chambers, respectively. The control lines may be used to control operation of the valve member by delivering fluid pressure to the first or second piston chamber. The passageways may comprise one or more of through bores, blind bores and side bores.

Alternatively, the valve member may define a second piston bore. The second piston bore may be arranged in parallel with (e.g. adjacent) the first piston bore. The second piston bore may have a length corresponding to that of the first piston bore. The distal section of the valve member may comprise the second piston bore. The second piston bore may extend into the valve member from the distal end of the valve member.

The second piston bore may define an open (distal) end configured to receive a second piston member. The second piston member may extend into the second piston bore to define a second piston chamber therein. The second piston member may be configured in the same way or in a similar way to the piston member described above. Here, the piston member described above may define a first piston member.

The second piston member may have a first (distal) end affixed or affixed relative to the valve body, for example the bonnet or cover plate of the valve body. The second piston member may have a second (proximal) end received within the second piston bore. The second piston member may be fixed with respect to the valve body and the valve member may be moveable with respect to the valve body.

It will be appreciated that such a configuration may provide for a compact valve design while maximising the piston area available (and thus force) to drive the valve member, for a given dimension (e.g. height) of the valve member. Such a valve apparatus may have particular utility in applications where a certain dimension of the valve member is constrained (for example, in a Blow Out Preventer (BOP) associated with an oil and gas well, where there may be certain constraints on the height of the valve member).

The second piston member may comprise a second piston rod. The second piston member may define a second piston head. The second piston head may comprise an enlarged diameter with respect to the second piston rod. Thus, the second piston member may define an enlarged second piston head. Alternatively, the second piston rod and second piston head may have the same diameter.

The second piston member may be configured to deliver fluid pressure to the second piston chamber.

The second piston chamber may be configured such that when supplied with fluid pressure, the valve member may be biased towards one of an extended and retracted position to occlude the flow path. Thus, fluid pressure in the first piston chamber of the first piston bore and fluid pressure in the second piston chamber of the second piston bore may act together to increase the force on the valve member to selectively occlude the flow path.

A second cylinder (end) cap may be disposed in an open (distal) end of the second piston bore. The second cylinder end cap may be fixed relative to the valve member. The second cylinder end cap may sealingly engage the valve member, for example the second piston bore of the valve member. The second cylinder end cap may have a bore through which the second piston rod may sealingly extend. The second piston head of the second piston member, received within the second piston bore, may comprise a size corresponding to that of the second piston bore. The second piston head may sealingly engage the second piston bore.

In combination with the example described above wherein the first piston bore is divided into first and second piston chambers by the first piston head, here the second piston head may divide the second piston bore into third and fourth piston chambers. In this case, the second piston chamber of the second piston bore described above may define the third piston chamber.

The third piston chamber may be configured such that when supplied with fluid pressure the valve member may be biased towards an extended configuration. The fourth piston chamber may be configured such that when supplied with fluid pressure the valve member may be biased towards a retracted configuration.

In this example, when supplied with fluid pressure, the first and third piston chambers may work together to bias the valve member towards an extended position, and the second and fourth piston chambers may work together to bias the valve member towards a retracted position.

The passageway of the piston member described above may be defined here as a first passageway. The first passageway may be an internal passageway. The first passageway may permit fluid communication between the first control line and the first piston chamber. The first passageway may comprise a gun drilled bore. The first passageway may comprise a through bore. The first passageway may comprise a blind bore. The blind bore may be formed in a proximal end of the first piston member (e.g. starting from the enlarged piston head). The first passageway may further comprise a first side port in fluid communication with the blind bore. The first side port may be located at a distal end of the first piston member.

The valve body may comprise an annular space around the first piston member. For example, the bonnet of the valve body may comprise a first hole of a size such that the annular space is formed between the first piston member (e.g. the first piston rod) and the first hole of the bonnet, at the point where the first piston member may be affixed to the bonnet.

The first side port may be in fluid communication with the annular space. The first hole may include a first control line port which fluidly connects to the first control line. Fluid pressure may fill the annular space when passing to and from the first passageway of the first piston member. The annular space may fluidly connect the first control line to the first passageway. The first annular space may be sealed.

The provision of the annular space means that the first side port does not need to be rotationally aligned with the first control line port for fluid pressure to be delivered from the first control line to the first piston chamber, which may provide for an improved, more reliable performance of the apparatus.

Similar to the first piston member, the second piston member may include a second passageway. The second passageway may permit fluid communication between the second control line and the fourth piston chamber.

The second passageway may comprise a second gun drilled bore. The second passageway may comprise a through bore. The second passageway may comprise a blind bore (e.g., a second blind bore). The blind bore may be formed in a proximal end of the second piston member. The second passageway may further comprise a side port (e.g., a second side port) in fluid communication with the blind bore. The side port may be located at a distal end of the second piston member.

The valve body may comprise an annular space (e.g. a second annular space) around the second piston member. For example, the bonnet of the valve body may comprise a second hole of a size such that the second annular space is formed between the second piston member and the second hole of the bonnet, at the point where the second piston member may be affixed to the bonnet.

The second side port may be in fluid communication with the second annular space. The second hole may include a second control line port which fluidly connects to the second control line. Fluid pressure may fill the second annular space when passing to and from the second passageway of the second piston rod. The second annular space may fluidly connect the second control line to the second passageway. The second annular space may be sealed.

In addition to the second side port, the second piston member may further include an additional side port (e.g. a third side port). The third side port may be located at a proximal end of the second piston member. The third side port may permit fluid pressure to be delivered to the fourth piston chamber.

It will be appreciated that since both the first and second piston members may each comprise a passageway having a blind bore and a (distal) side port there may be certain advantages in the manufacturing process for the piston members, that is a first stage of the manufacturing process may be the same for both piston members, which may save on manufacturing costs while increasing efficiency, with every second piston member undergoing a second stage of manufacture where the additional (third) side port is formed.

Moreover, the provision of the first and second piston members as described above may provide for a simpler construction and operation of the valve apparatus than would be required for a double-acting valve member having only a single piston bore comprising two piston chambers.

To prevent fluid pressure being delivered to the third piston chamber from the second control line, the blind bore of the second piston member may terminate in a plugged connection (i.e. at the second piston head). Thus, fluid pressure is instead directed through the third side port into the fourth piston chamber.

Alternatively, the first and second piston members may be manufactured in the same way, i.e. where all piston members are manufactured to comprise the additional side port, with additional plugged connections being provided where appropriate.

In another example the first and second piston rods may instead comprise a through bore, rather than a blind bore, obviating the need for the first and second side ports and annular spaces. In this example, the first and second control lines may be connected to open (distal) ends of the through bores in the piston members.

The first and third piston chambers may be configured in fluid communication with each other, and the second and fourth piston chambers may be configured in fluid communication with each other, for example by first and second fluid channels. Accordingly, fluid pressure delivered to the first chamber may pass through the first fluid channel into the third chamber, and fluid pressure delivered to the fourth chamber may pass through the second fluid channel into the second chamber.

In other words, fluid pressure delivered through the first passageway of the first piston member may act to bias the valve member to an extended position to close the flow path. Therefore, the first passageway of the first piston member may be defined as a closing passageway (or a closing bore). Conversely, the second passageway of the second piston member may be defined as an opening passageway (or an opening bore).

Such a configuration of piston chambers and fluid channels may provide for a balanced force to act across the valve member, while increasing the available piston area upon which pressure acts to drive the valve member, thus further providing for a compact valve design. Furthermore, it will be appreciated that a greater force may act on the valve member when closing the flow path (i.e. moving the valve member to an extended position) than when opening the flow path (i.e. moving the ram valve member to a retracted position), by virtue of the first and third piston chambers having a greater piston area than the second and fourth piston chambers, which may provide certain advantages during operation of the valve apparatus.

In another example, the valve member may comprise more than two piston bores, for example three, four of five, etc., piston bores, to increase the available piston area. The provision of additional piston bores may be useful when a larger force is required to operate the valve member, but where a particular dimension (e.g. height) of the valve member is limited.

The valve apparatus may further comprise a second valve member. The second valve member may be provided in accordance with the valve member described above. In this example, the valve member described above may define a first valve member.

The second valve member be located on an opposite side of the flow path to the first valve member in the valve cavity at the same axial location. The first and second valve members may define ram valve members such as might be typically found in a Blow Out Preventer (BOP) (e.g., shear ram, pipe ram, blind ram etc.). In this example the first and second valve members may extend in cantilever form into the flow path.

It will be appreciated that multiple valve apparatuses may be provided together for a particular application. For example, in the case of a BOP, multiple valve apparatuses may be provided stacked on top of one another. The stack of valve apparatuses may be configured to provide the function of one or more of a shear ram, pipe ram and blind ram.

The first valve member may be provided with an indicator member configured to indicate the position of the first valve member within the valve body. For example, the indicator member may comprise one or more rods fixed to a distal end of the first valve member. The rod may extend through and protrude out of the bonnet via a sealing package such that a position of the ram valve member is indicated.

The second valve member may also be provided with an indicator member of the same description.

The indicator members may function as a ram lockout assembly, allowing the valve members to be moved (e.g. manually) into a fully retracted or extended position. The indicator members may comprise a modular component configured to be mounted and/or demounted to the valve members as and when required. Additionally, it will be appreciated that when the valve members are in a fully extended position, the indicator members may be level with (and thus not protrude from) the valve body, such that the indicator members may be protected during movement of the valve apparatus.

In an aspect of the present disclosure a valve apparatus comprises:
  a valve body defining a flow path therethrough;
  a valve member mounted within the valve body, the valve member defining a piston bore; and
  a piston member fixed relative to the valve body and extending into the piston bore to define a piston chamber therein, wherein the valve member is moveable relative to the piston member to selectively occlude the flow path.

It will be appreciated that such a configuration may provide for a compact valve design.

In an aspect of the present disclosure a valve apparatus comprises:
  a valve body defining a flow path therethrough;
  a valve member mounted within the valve body, the valve member defining a piston bore having an open end;
  a piston member fixed relative to the valve body and comprising a piston rod and a piston head, the piston head dividing the piston bore into first and second piston chambers; and
  wherein the valve member is moveable relative to the piston member to selectively occlude the flow path.

Such a configuration of valve apparatus may provide for a compact valve design while permitting the valve member to be operated between extended and retracted positions by virtue of fluid pressure delivered to the first and second piston chambers within the valve member. Such a valve apparatus may be considered as a double-acting valve apparatus (i.e. capable of acting in two direction).

In an aspect of the present disclosure a valve apparatus comprises:
  a valve body defining a flow path therethrough;
  a valve member mounted within the valve body, the valve member defining a first piston bore and a second piston bore;

a first piston member fixed relative to the valve body and extending into the first piston bore to define a first piston chamber therein; and a second piston member fixed relative to the valve body and extending into the second piston bore to define a second piston chamber therein, wherein the valve member is moveable relative to the first and second piston members to selectively occlude the flow path.

It will be appreciated that such a configuration may provide for a compact valve design while maximising the piston area available (and thus force) to drive the valve member, for a given dimension (e.g. height) of the valve member. Such a valve apparatus may have particular utility in applications where a certain dimension of the valve member is constrained (for example, in a Blow Out Preventer (BOP) associated with an oil and gas well, where there may be certain constraints on the height of the valve member).

The valve apparatus according to any one of the aspects described above may comprise features and functionality presented in accordance with any other aspect.

It will be appreciated that in other examples the valve member itself be provided in isolation to function as an actuator for actuation of other infrastructure. For example, the valve assembly may function as a fluid powered actuator, which may be used to provide actuation for linear operations.

Thus, in an aspect of the present disclosure a fluid powered actuator comprises:

an actuator body;

an actuator member mounted within the actuator body, the actuator member defining a first piston bore having a first open end and a second piston bore having a second open end; and a first piston member and a second piston member fixed relative to the actuator body, the first piston member extending into the first piston bore and the second piston member extending into the second piston bore, wherein the first and second piston members each comprise a piston head dividing the first piston bore into first and second piston chambers and the second piston bore into third and fourth piston chambers, respectively, and wherein the first and third piston chambers are in fluid communication and the second and fourth piston chambers are in fluid communication.

In another example, the valve member may form part of the actuator assembly and be mounted within the piston bore to define the piston chamber. The valve member, by functioning as the piston member, may assist to minimise complexity. For example, by the valve member itself forming part of the actuator assembly the requirement for external actuators may be minimised or eliminated. Furthermore, by the valve member itself forming part of the actuator assembly a compact valve design may be achieved while still presenting a large piston area and thus a larger force for a given operating pressure. That is, by the valve member acting as the piston member, a lateral cross-sectional area of the entire valve member may potentially define a piston area.

Thus, in an aspect a valve apparatus comprises:

a valve body defining a flow path therethrough;

a piston bore within the valve body; and a valve member mounted within the piston bore to define a piston chamber, wherein the valve member is moveable in accordance with fluid pressure within the piston chamber to selectively occlude the flow path.

In this respect the piston bore and the valve member, with the piston chamber defined therebetween, may collectively define the actuator assembly.

The valve member may be considered to be directly actuated by pressure within the piston chamber. That is, pressure within the piston chamber may directly act on the valve member. The valve member, for example and end face of the valve member, may define a boundary of the piston chamber. In this respect, movement of the valve member within the piston bore may be associated with a variation in the volume of the piston chamber.

The valve member may define a piston head mounted within the piston bore and configured in pressure communication with the piston chamber. The piston head may define an end region, for example an end face, of the valve member. Alternatively, the piston head may be defined as a protrusion, such as an upstanding rib, extending around a periphery of the valve member. Such a protrusion may permit a desired piston shape to be achieved, independently of the shape of the remainder of the valve member. As such, the form of the piston head may be provided in accordance with design parameters associated with valve actuation (such as piston area, sealing form etc.), whereas the form of the valve member may be provided in accordance with its function as a valve member (for example sealing engagement with a valve seat, providing a cutting function etc.).

A protruding piston head arrangement may facilitate reverse operation of the valve member (i.e., the valve member may define a double acting piston), which will be described in further detail below.

The valve member, for example a piston head of the valve member, may define any suitable cross-sectional shape. In this respect the cross-sectional shape may be defined in a transverse or lateral plane through the valve member. Such a transverse or lateral plane may be transverse or lateral relative to a direction of movement or stroking of the valve member. In some examples the valve member, for example a piston head of the valve member, may be non-round in lateral cross-section. For example, the valve member may be generally elongate in lateral cross-section. Such elongation may be such that a width of the valve member is greater than a height in the same lateral plane. In this respect the valve member may be arranged within the valve apparatus such that the width of the elongated lateral cross section is aligned transverse to the flow path, whereas the height of the elongated lateral cross section is generally aligned, for example parallel to, the flow path. Thus, the elongated cross-sectional shape may permit the width of the valve member to provide sufficient occlusion to the flow path, while maintaining a compact design along the direction of the flow path. This arrangement may have multiple advantages, such providing a low profile valve, more readily allowing multiple valves or valve portions to be stacked axially along the direction of the flow path (for example to provide multiple barriers within the flow path), and/or the like.

The valve member may be generally oval in cross-section. The valve member may be elliptical in cross-section. The valve member may define a continuously curved lateral cross-sectional shape, for example oval cross-sectional shape. This arrangement might assist any sealing integrity, for example between the valve member across its section and the piston bore and/or the flow path.

In some examples the valve member may be generally stadium shaped in cross-section. The stadium shape may be formed by a substantially rectangular region with rounded, for example semi-circular, opposing sides. The stadium cross-sectional form of the valve member may alternatively or also be defined as being discorectangle, obround, or a sausage body.

In examples where the valve member defines the piston member, the shape of the piston bore may compliment the shape of the valve member, for example the shape of a piston head of the valve member. For example, the piston bore may be generally elongated, non-round, oval, stadium shaped etc. in lateral cross section.

The valve apparatus may comprise a sealing arrangement between the piston bore and the valve member, for example a piston head of the valve member. The sealing arrangement may be mounted on the valve member, for example on a piston head of the valve member. In one example the sealing arrangement may comprise at least one sealing member, such as an O-ring. The at least one sealing member may be mounted in a sealing groove, recess or the like within an outer surface of the valve member, for example within an outer surface of a piston head of the valve member. The valve member may comprise a seal retaining element configured to secure the seal member in place. The seal retaining element may define one side of a groove or recess. In one example the seal retaining element may be provided as a retaining cap, located at or defining an end face of the valve member. The retaining cap may be exposed to pressure within the piston chamber. The retaining cap may at least partially define a piston head.

The sealing arrangement may seal the piston chamber. The sealing arrangement may provide sealing between the piston chamber and the flow path.

The piston bore may be defined by the valve body. In one example, the piston bore may be defined by a portion of a valve cavity defined within the valve body. In alternative examples the piston bore may be defined by a separate component, such as a sleeve, tube, cylinder, liner, and/or the like located within the valve body.

In one example the actuator assembly may be provided separately from the valve member.

For example, the piston member may be provided separately from the valve member. The piston member may be engaged or associated with the valve member, such that movement of the piston member relative to the piston bore causes movement of the valve member. In this example the piston bore may be statically mounted or provided within the valve body. The piston member may be separately provided from the valve member and secured or otherwise engaged with the valve member, for example via fixings, inter-engaging profiles, welding, bonding and/or the like. However, in other examples the piston member may be integrally formed with the valve member, for example by a protrusion, such as an axial protrusion, rod and/or the like. In this example, however, although the valve member and the piston member may be integrally formed, the profile or shape of the piston member may not consist of the lateral sectional form of the valve member. In some examples the piston member may comprise a round profile in lateral cross-section, whereas the valve member may comprise a non-round, such as elongate, profile in cross-section.

In one example the piston bore may be engaged or associated with the valve member, such that movement of the piston bore relative to the piston member causes movement of the valve member. In this example the piston member may be statically mounted or provided within the valve body. The piston bore may be provided separately from the valve member and secured or otherwise engaged with the valve member, for example via fixings, inter-engaging profiles, welding, bonding and/or the like. In this example the piston bore may be provided in the form of a sleeve, tube, cylinder, liner etc. However, in other examples the piston bore may be integrally formed with or within the valve member, for example by a drilled or otherwise formed bore, such as an axial bore, extending into the valve member.

The actuator assembly may be provided on one side of the valve member, for example on one lateral side of the valve member.

In one example multiple actuator assemblies may be provided. For example, at least one actuator assembly may be provided on one lateral side of the valve member, and at least one other actuator assembly may be provided on an opposite lateral side of the valve member. At least one actuator assembly may be arranged to move the valve member in one direction. At least one actuator assembly may be arranged to move the valve member in opposite directions. At least one actuator assembly may be arranged to move the valve member in one direction and at least one other actuator assembly may be arranged to move the valve member in an opposite direction. At least two actuator assemblies may be arranged to move the valve member in a common direction.

The valve member may be operable to move in reverse directions. In one example the actuator assembly may be configured to move the valve in a first direction, and the valve member may be biased in an opposite, second direction. In this example movement of the valve member in the first direction under control of the actuator assembly may be against the bias acting in the second direction. Thus, the force of actuation provided by fluid pressure within the piston chamber must exceed the bias force acting in the second direction (and any further resistance forces) to cause the valve member to move in its first direction. Upon relief of actuation pressure within the piston chamber the bias force may cause the valve member to move in its second direction.

The bias force may be provided by a spring arrangement, such as a mechanical spring, gas spring and/or the like. Alternatively, or additionally, the bias force may be provided by fluid pressure within the flow path of the valve body. For example, fluid pressure within the flow path may act over a sealed area of the valve member which is exposed to the flow path to establish a bias force in the second direction.

The actuator assembly may be configured to move the valve member in reverse first and second directions. In this respect the piston chamber may define a first piston chamber and the actuator assembly may further comprise a second piston chamber. Fluid pressure within the first piston chamber may bias the valve member to move in the first direction, and fluid pressure within the second piston chamber may bias the valve member to move in the second direction, such that control of the fluid pressures within the first and second piston chambers provides desired control of movement of the valve member.

The first and second piston chambers may be provided on opposing sides of the piston member. The first and second piston chambers may be provided on opposing sides of a common piston head provided on the piston member such that fluid pressure in both the first and second piston chambers act on the common piston head. Alternatively, the first and second piston chambers may be in pressure communication with separate regions, for example separate piston heads, of the piston member. In one example, the first and second piston chambers may be in pressure communication with respective end regions, for example end faces, of the piston member.

The first and second piston chambers may be provided within the same piston bore. In this example, a piston head of the piston member may divide the same piston bore into the first and second piston chambers Alternatively, the first and second piston chambers may be provided in separate piston bores within the valve body. In this example the actuator assembly may comprise:
- first and second piston bores; and
- a piston member mounted in or extending into both the first and second piston bores;
- wherein the first piston chamber is defined between the first piston bore and the piston member, and the second piston chamber is defined between the second piston bore and the piston member. Movement of the piston member may be provided in accordance with fluid pressures within the first and second piston chambers.

The first and second piston bores may be provided on opposite sides, for example diametrically opposite sides, of the flow path. In this example the piston member may extend across the flow path. For example, a first end of the piston member may extend into the first piston bore, and an opposite second end of the piston member may extend into the second piston bore.

In examples where the valve member defines the piston member, the valve member may thus extend between the first and second piston bores, for example to extend across the flow path between the first and second piston bores. In this example the valve member may define a double acting piston member. A first end of the valve member may extend into the first piston bore, and an opposite second send of the valve member may extend into the second piston bore.

A first piston area may be defined within the first piston chamber, wherein pressure within the first piston chamber acts over the first piston area to bias the valve member in a first direction. A second piston area may be defined within the second piston chamber, wherein pressure within the second piston chamber acts over the second piston area to bias the valve member in an opposite second direction.

The first and second piston areas may define a substantially equivalent piston area. Alternatively, the first and second piston chambers may define different piston areas. The provision of different piston areas may permit a desired bias on the piston member to be achieved. For example, a common source of fluid pressure applied to both the first and second piston chambers will result in a pressure force imbalance, thus causing the valve member to be moved in accordance with the dominant pressure force (excluding other influences such as other bias forces, drag friction etc.). This bias achievable by the differential piston area may provide a number of advantages.

The valve apparatus may be operated by a pressure source, for example from a pump, accumulator, high ambient pressure and/or the like. In some examples the valve apparatus may comprise or be operated in combination with an accumulator. The accumulator may be provided to provide a primary source of operating pressure. Alternatively, or additionally, the accumulator may be used in contingency situations, for example where a primary source of operating pressure is lost. In some examples fluid displaced from a piston chamber during normal operation may be used to at least partially charge the accumulator.

The valve apparatus may comprise a regenerative fluid control arrangement. The regenerative fluid control arrangement may comprise a first control line in pressure communication with the first piston chamber having a first piston area therein, and a second control line in pressure communication with the second piston chamber having a second piston area therein, wherein the first piston area is larger than the second piston area. The first and second control lines may be configurable, for example selectively configurable, in communication with a pressure source, such as a pump, accumulator, and/or the like.

Pressure communication involves facilitating pressure within one region to be to be presented in another region. Such communication may be achieved with or without fluid communication. For example, where fluid communication is also present the fluid being communicated may act as a pressure transfer medium. Where fluid communication is not present, a pressure transfer arrangement, such as a piston, flexible barrier, bladder etc. may be provided. Pressure communication without corresponding fluid communication may have advantages in circumstances where the pressure of a contaminated fluid (such as a fluid containing particulate material etc.) is to be transferred to a region which advantageously should be maintained as clean as possible.

The regenerative fluid control arrangement may be configurable between a first configuration in which the valve member is operated to move in a first direction, and a second configuration in which the valve member is operated to move in a reverse second direction.

When in the first configuration the second control line provides pressure communication between the second chamber and the pressure source, whereas the first control line provides pressure communication between the first chamber and a low pressure sink. The low pressure sink may comprise a vent, such as an ambient pressure vent. In this case the pressure from the pressure source may act within the second piston chamber over the second piston area, without or with minimal resistance from pressure within the first piston chamber. In this respect, while the first piston chamber includes the larger first piston area, the pressure force applied will be lower by virtue of being in communication with a low pressure sink or vent.

When in this first configuration the driving force applied on the valve member may be considered to be a function primarily of the pressure from the pressure source acting over the second piston area which causes biasing of the valve member in its first direction.

Movement of the valve member in its first direction will be accompanied by an increase in volume of the second piston chamber, and a decrease in volume of the first piston chamber. However, as the first piston chamber is in pressure communication with a pressure sink, the fluid displaced from the first piston chamber does not form part of the high pressure circuit driven by the pressure source. The speed of operation of the valve member may thus be a function of the rate at which the second piston chamber may be filled with an operating fluid driven exclusively via the second control line.

When the regenerative fluid control arrangement is in its second configuration both the first and second chambers are provided in communication with the pressure source via the respective first and second control lines. Thus, a common pressure is applied over both the first and second piston areas, such that a force imbalance will be created by virtue of the differential piston area, biasing the valve member in its second direction.

When in this second configuration the driving force applied on the valve member may be considered to be a function primarily of the pressure from the pressure source acting over the differential between the first and second piston areas. Depending on the magnitude of the differential area, the driving force may be less than that achievable when the regenerative fluid control arrangement is in its first configuration.

However, the differential area may be intentionally designed within the valve apparatus to achieve a desired driving force or bias in the second direction.

Movement of the valve member in its second direction will be accompanied by an increase in volume of the first piston chamber, and a decrease in volume of the second piston chamber. As both the first and second piston chambers are in communication with the pressure source, fluid displaced form the second piston chamber will remain within the pressurised circuit driven by the pressure source. As such, a more rapid operation of the valve member may be achievable when the regenerative fluid control arrangement is in its second configuration. This rapid operation may be advantageous in a number of applications, for example where a rapid reaction to open and/or close is desired. This second configuration may thus also be defined as a regenerating configuration.

In some examples the regenerative control arrangement may be configurable in a third configuration in which the valve member is also operated to move in its second direction. When in this third configuration the first control line provides pressure communication between the first chamber and the pressure source, whereas the second control line provides pressure communication between the first chamber and a low pressure sink. The low pressure sink may comprise a vent, such as an ambient pressure vent. In this case the pressure from the pressure source may act only within the second piston chamber over the second piston area, without or with minimal resistance from pressure within the first piston chamber, thus providing an increase in operating force acting on the valve member relative to the second configuration. However, fluid displaced from the first piston chamber will no longer form part of the pressurised circuit driven by the pressure source, and as such the rate of movement of the valve member may be less relative to the second configuration. As such, movement of the valve member in the second configuration may be achieved faster at a lower force, whereas movement of the valve member in the third configuration may be achieved slower at a higher force.

Thus, the valve member may be moveable in its second direction when the regenerative control arrangement is in either its second or third configuration. As noted above, when the regenerative control arrangement is in its second, or regenerating, configuration the driving force applied on the valve member may be reduced, depending on the magnitude of the differential piston area. This reduction in force may be acceptable in some circumstances, particularly where the trade-off in increased valve speed is preferred. However, some circumstances may require a larger force to be available when the valve is or is to be moved in its second direction. In such a circumstance the third configuration of the regenerative control arrangement may be selected.

The third configuration of the regenerative control arrangement may be initiated prior to any movement of the valve member in its second direction. However, in other examples the third configuration of the regenerative control arrangement may be initiated following a period of movement of the valve member in its second direction with the regenerative control arrangement in its second configuration. This may be used where a first phase of movement of the valve member in its second direction may preferentially or acceptably performed with a lower force and higher speed, whereas a second phase of movement of the valve member in its second direction may preferentially be performed with a higher force, albeit at the expense of speed. Such a circumstance may occur where, for example, the valve member meets an obstacle during movement in the second direction (such as an obstacle extending within the flow path). The higher force may assist in displacing the obstacle, deforming the obstacle, cutting the obstacle, and/or the like.

In other examples the second configuration of the regenerative control arrangement may be initiated following a period of movement of the valve member in its second direction with the regenerative control arrangement in its third configuration. This may be used where a first phase of movement of the valve member in its second direction may preferentially be performed with a higher force and lower speed, whereas a second phase of movement of the valve member in its second direction may preferentially be performed with a lower force and higher speed.

The regenerative control arrangement may be manually reconfigurable between its second and third configurations, for example manually reconfigured by intervention of a user, such as via the operation of a switch or the like.

The regenerative control arrangement may be autonomously or automatically reconfigurable between its second and third configurations, such as in response to sensed parameters associated with the valve apparatus. For example, sensed data associated with the valve member being restricted may autonomously trigger or activate the third configuration of the regenerative control arrangement to apply a high operating driving force.

The valve apparatus may comprise a gate valve member. In one example the valve member may extend in cantilever form into the flow path to selectively occlude said flow path. Alternatively, the valve member may be supported on opposite sides of the flow path. For example, opposing sides of the valve member may be mounted within a portion of a valve cavity provided on opposing sides of the flow path. In some examples, as noted above, opposing sides of the valve member may be mounted within respective piston chambers, such that control of fluid pressure within the piston chambers facilitates desired movement or stroking of the valve member.

The valve member may comprise a through hole, wherein a relative alignment or misalignment between the through hole and the flow path provides the desired occlusion of the flow path. In one example the through hole may be entirely misaligned with the flow path to provide complete occlusion or closure of the flow path.

The valve apparatus may comprise a ram valve member, such as might be typically found in a Blow Out Preventer (BOP) (e.g., shear ram, pipe ram, blind ram etc.). In this example the valve member may extend in cantilever form into the flow path. Such a ram valve member may operate in conjunction with one or more further ram valve members to provide a desired selective occlusion of the flow path.

The valve apparatus may comprise multiple valve members. In this respect, any reference to features, aspects or functionality of a single valve member as presented anywhere herein, may be equally applied to multiple valve members.

At least two valve members may be arranged axially along the flow path. Such at least two valve members may facilitate the ability to provide occlusion to the flow path at multiple axial locations within the flow path. In some examples this may accommodate the ability to provide multiple pressure barriers. This may also accommodate multiple different functions. For example, one or more valve members at one axial position may provide a cutting function at that position, whereas one or move valve members at a different axial position may provide a pipe sealing function at that different position. Multiple variations of differing functions may of course be possible.

At least two valve members may be provided which cooperate with each other to selectively occlude the flow path. At least two valve members may define a ram valve member, such as might typically be found in a BOP (as referenced above). Each valve member may comprise its own actuator assembly or assemblies. Each valve member may be provided in substantially similar form.

At least two valve members may be provided on opposite sides, for example diametrically opposite sides of the flow path. At least two valve members may be provided to operate at a common axial location along the flow path. Such an arrangement may be such that the at least two valve members operate within a common plane extending through the flow path, for example a plane extending transversely through the flow path.

The valve member may provide sealing of the flow path when said valve member is in its closed configuration. Such sealing may be achieved via a single valve member, or alternatively via multiple valve members operating together.

The valve member, when in its closed position, may permit a pressure differential to be applied or held across the valve member. The valve apparatus may be configured to permit the valve member to seal the flow path in a single direction. Alternatively, the valve apparatus may be configured to permit the valve member to seal the flow path in opposite directions.

The valve apparatus may comprise a valve seat, wherein the valve member engages said valve seat to provide sealing of the flow path when said valve member is in its closed position. The valve member may cooperate with the valve seat to provide sealing in a single or in opposite directions. The valve seat may extend around the periphery of the flow path.

The valve apparatus may comprise a first valve seat provided on a first side of the valve member, and a second valve seat provided of a second side of the valve member, opposite the first side in the direction of the flow path. The valve member may sealingly engage the first valve seat to provide sealing of the flow path in a first direction, and sealingly engage the second valve seat to provides sealing of the flow path in a reverse second direction.

At least a portion of the valve member may be compliantly mounted within the valve apparatus such that when the valve member is in a closed position at least a portion of said valve member may be biased in a direction of a pressure differential applied across the valve member. Such an arrangement may function to establish and/or improve sealing integrity across the valve member, for example by increasing a sealing pressure of the valve member against an associated valve seat. Where the valve apparatus is configured to permit sealing in a single direction, the compliant mounting of at least a portion of the valve member may permit sealing to be disrupted in one direction, for example by allowing at least a portion of the valve member to be lifted from an associated valve seat. This may provide desired functionality, such as permitting pressure equalisation, providing a pump-through capability when the valve member is in its closed position, and/or the like.

The valve member may be defined by a unitary component. Alternatively, the valve member may comprise multiple components assembled together to define the valve member. The valve member may comprise a valve carriage which is moveable within the valve apparatus in accordance with pressure within the piston chamber. The valve member may comprise a valve body mounted on the valve carriage. The valve body may be configured to engage one or more valve seats within the valve apparatus.

The valve body may be rigidly secured relative to the valve carriage, such that the valve body has the same degree(s) of freedom as the valve carriage. Alternatively, the valve body may be moveable relative to the valve carriage in at least one direction. In one example the valve body may be moveable relative to the valve carriage in the direction of the flow path. In this respect the valve body may be compliant with respect to flow and/or pressure with the flow path. This arrangement may be such that when the valve member is in a closed position the valve body may be biased in a direction of a pressure differential applied across the valve member, which may function to establish and/or improve sealing integrity across the valve member. Where the valve apparatus is configured to permit sealing in a single direction, the compliant mounting of the valve body may permit sealing to be disrupted in one direction, for example by allowing at least a portion of the valve body to be lifted from an associated valve seat.

The valve body may be a replaceable component, for example replaceable independently of the valve carriage.

The valve member may comprise a first valve body mounted on one side of the valve carriage, and a second valve body mounted on an opposite side of the valve carriage, with respect to the flow path. One or both of the first and second valve bodies may be rigidly fixed to the valve carriage. One or both of the first and second valve bodies may be compliantly mounted relative to the valve carriage. In one example the first and second valve bodies may be moveable relative to each other, for example in the direction of the flow path. The first and second valve bodies may be driven in a desired direction during movement of the valve member. For example, upon closure of the valve member the first and second valve bodies may be driven towards respective valve seats.

The valve member may be configured to cut an object located within the flow path. Such an object may comprise any object which might be present within the specific field of deployment of the valve apparatus. To provide an example, in the oil and gas industry the object may comprise wireline, slickline, coiled tubing, tool strings and/or the like.

The valve member may comprise a shearing cutting arrangement.

The valve member may comprise a cutting edge, such as a knife edge. Such a cutting edge may be integrally provided with a component of the valve member, may be provided as a separate insert and/or the like.

The valve member may be configured to cooperate with another feature of the valve apparatus to facilitate cutting of an object. In one example the valve member may cooperate with a valve seat to cut an object. The valve member may cooperate with a further valve member to cut an object.

The valve apparatus may comprise one or more injection ports to facilitate injection of a material into the valve body. In some examples the one or more injection ports may permit a sealant material, lubricant material and/or the like to be injected into the valve body. At least one injection port may facilitate injection of a material in the region of the valve member, valve seat, actuator assembly and/or the like.

The valve body may be provided as a unitary component. Alternatively, the valve body may be modular in construction, for example comprising two or more parts interconnected together.

In some examples the valve body may define one or more of the piston bores. In one example the valve body may define a wing portion, wherein the wing portion defines a piston bore. In some examples the wing portion may be integrally formed with the valve body. Alternatively, at least a portion of the wing portion may be provided as a separate component. In this example the valve body may comprise a central module which defines at least part of the flow path, and one or more wing modules which are mounted on the central module.

The valve apparatus may be used in any desired application or industry. In one example, the valve apparatus may have utility in the oil and gas industry, for example to provide flow control of flow to and/or from a wellbore. In some examples the valve apparatus may provide function as a BOP. In alternative examples, the valve apparatus may have utility in aerospace applications, for example to provide hydraulic control.

An aspect of the present disclosure relates to a method for providing selective occlusion to a flow path, comprising applying operating pressure to a piston chamber defined between a piston bore and a piston member of an actuator assembly mounted within a valve body which defines a flow path therethrough, wherein one of the piston bore and piston member is engaged or associated with a valve member mounted within the valve body such that the valve member is moveable in accordance with the operating pressure within the piston chamber to selectively occlude the flow path.

The method according the aspect above may comprise operating a valve apparatus according to any other aspect.

An aspect of the present disclosure relates to a valve apparatus, comprising:
 a valve body defining a flow path therethrough;
 a piston bore within the valve body; and
 a valve member mounted within the piston bore to define a piston chamber, wherein the valve member is moveable in accordance with fluid pressure within the piston chamber to selectively occlude the flow path.

The valve apparatus according to the aspect above may comprise features and functionality presented in accordance with any other aspect.

An aspect of the present disclosure relates to a valve apparatus, comprising:
 a valve member mounted within a valve body and operable to selectively occlude a flow path within the valve body;
 an actuator comprising a first piston chamber having a first piston defining a first piston area, and a second piston chamber having a second piston defining a second piston area, wherein the first piston area is larger than the second piston area; and
 a regenerative fluid control arrangement.

The regenerative fluid control arrangement may comprise:
 a first control line in pressure communication with the first piston chamber, and a second control line in pressure communication with the second piston chamber, the first and second control lines being configurable in communication with a pressure source.

The regenerative fluid control arrangement may be configurable between a first configuration in which the valve member is operated to move in a first direction, and a second configuration in which the valve member is operated to move in a reverse second direction.

When in the first configuration the second control line provides pressure communication between the second chamber and the pressure source, whereas the first control line provides pressure communication between the first chamber and a low pressure sink.

When the regenerative fluid control arrangement is in its second configuration both the first and second chambers are provided in communication with the pressure source via the respective first and second control lines. Thus, a common pressure is applied over both the first and second piston areas, such that a force imbalance will be created by virtue of the differential piston area, biasing the valve member in its second direction.

The regenerative control arrangement may be configurable in a third configuration in which the valve member is also operated to move in its second direction. When in this third configuration the first control line provides pressure communication between the first chamber and the pressure source, whereas the second control line provides pressure communication between the first chamber and a low pressure sink.

The regenerative control arrangement defined in relation to the present aspect may be provided in accordance with that described in relation to any other aspect. Furthermore, the valve apparatus according to the aspect above may comprise features and functionality presented in accordance with any other aspect.

An aspect of the present disclosure relates to a method for controlling a valve apparatus, comprising:
 providing a valve which comprises a valve member, an actuator for operating the valve member, the actuator comprising a first piston chamber having a first piston defining a first piston area, and a second piston chamber having a second piston defining a second piston area, wherein the first piston area is larger than the second piston area, a regenerative fluid control arrangement and
 configuring the regenerative fluid control arrangement between a first configuration in which the valve member is operated to move in a first direction, and a second configuration in which the valve member is operated to move in a reverse second direction.

The method according to the aspect above may comprise operating a valve apparatus according to any other aspect.

An aspect of the present disclosure relates to a valve apparatus, comprising:
 a valve body defining a flow path therethrough;
 first and second valve members mounted with within the valve body;
 a first actuator assembly mounted internally within the valve body and comprising a first piston bore and first piston member defining a first piston chamber therebetween, wherein one of the first piston bore and first piston member is engaged or associated with the first valve member; and
 a second actuator assembly mounted internally within the valve body and comprising a second piston bore and second piston member defining a second piston chamber therebetween, wherein one of the first piston bore and first piston member is engaged or associated with the second valve member,
 wherein the first and second valve members are moveable in accordance with fluid pressure within the respective first and second piston chambers to selectively occlude the flow path.

The valve apparatus according to the aspect above may comprise features and functionality presented in accordance with any other aspect.

BRIEF DESCRIPTION OF THE DRAWINGS

These and other aspects of the present disclosure will now be described, by way of example only, with reference to the accompanying Figures, in which.

DETAILED DESCRIPTION OF THE DRAWINGS

Figure 1:
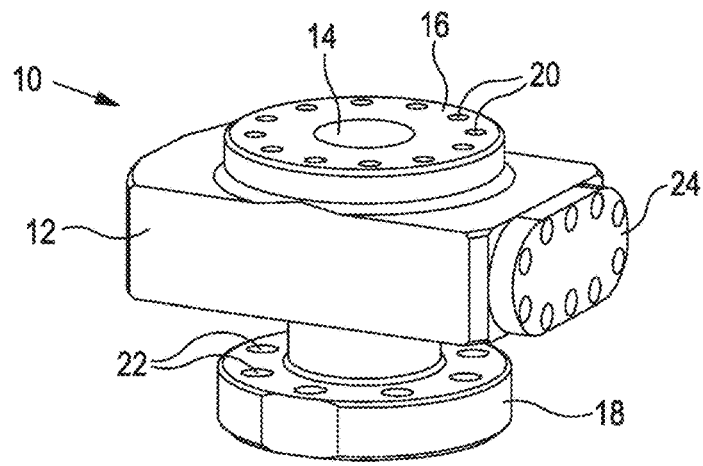
FIG. 1 is an isometric view of a valve apparatus.

An isometric view of a valve apparatus, generally identified by reference numeral 10, is shown in FIG. 1. The valve 10 is not specifically disclosed or restricted for any specific purpose. However, purely for exemplary purposes, the valve 10 may have utility in aerospace applications, oil and gas applications, processing plant applications etc.

The valve 10 includes a valve body 12 which defines a flow path 14 extending therethrough between opposing first and second flange connectors 16, 18. The first flange 16 may be defined as a low profile or blind flange which incorporates a plurality of threaded holes 20 to accommodate a screwed connection with a further flanged component, as might be the case when securing to a conduit, cross-over unit, further valve body and/or the like. In the present example the second flange 18 is of a different construction, in this case of a necked flange construction which includes a plurality of bolt holes 22 to accommodate a bolted connection with a further flanged component, as might be the case when securing to a conduit, cross-over unit, further valve body and/or the like. In other examples different flange types or different modes of connecting to other infrastructure may be provided.

As will be described in further detail below, the valve body 12 defines an internal valve cavity (not visible on FIG. 1) and a removable cover plate or bonnet 24 which permits access to the internal valve cavity. As will also be described in further detail below, the internal valve cavity accommodates a valve member and an internal actuator for operating the valve member to selectively occlude the flow path 14. Thus, and as is apparent from FIG. 1, the valve 10 does not incorporate any external actuator. As such, complexities associated with locating and mounting of an external actuator and of ensuring sealing integrity around a valve operator which extends into the valve body may be minimised.

Figure 2:
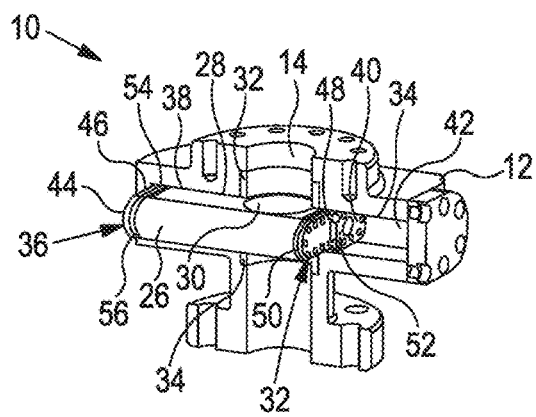
FIGS. 2 and 3 provide sectional views of the valve apparatus of FIG. 1 in an open configuration.
Figure 3:
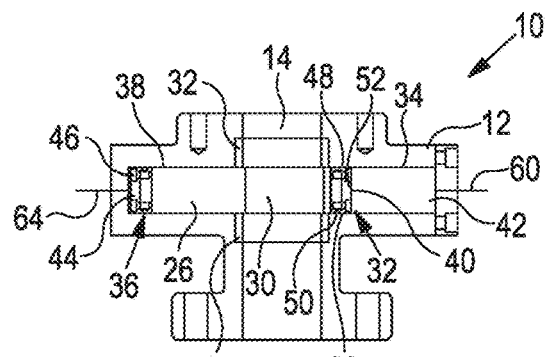

Reference is now made to FIGS. 2 and 3, wherein FIG. 2 is an isometric partial cross-sectional view of the valve apparatus 10 of FIG. 1, and FIG. 3 is a sectional elevation view of the valve apparatus 10, in both cases with the valve 10 in an open configuration. The valve apparatus 10 includes a gate valve member 26 mounted within a valve cavity 28 and includes a through hole 28 which in the present illustrated open configuration is aligned with the flow path 14. The valve apparatus 10 further includes first and second valve seats 32, 34 circumscribing the flow path 14 on opposite axial sides (relative to the flow path 14) of the valve member 26. As will be described in further detail below, the first and second valve seats cooperate with the valve member to seal the flow path 14 when the valve member 26 is moved to its closed position.

A first end 32 of the valve member is received within a first piston bore 34 formed by the valve cavity 28, and an opposite second end 36 of the valve member 26 is received within a second piston bore 38 formed by the valve cavity 28, such that the valve member 26 extends between the first and second piston bores 34, 38 and across the flow path 14. The first end 32 of the valve member 26 defines a first piston head 40 which together with the first piston bore 34 defines a first piston chamber 42. The second end 36 of the valve member 26 defines a second piston head 44 which together with the second piston bore 38 defines a second piston chamber 46.

The first piston head 40 is sealed relative to the first piston bore 34 via a seal (such as an O-ring) 48. In the present example the seal 48 is located within a seal groove 50 and held in place with a retaining plate 52. For clarity reasons, only one half of the seal 48 and retaining plate 52 is illustrated in FIG. 2. The seal 48 functions to isolate the first piston chamber 42 from the flow path 14.

Similarly, the second piston head 44 is sealed relative to the second piston bore 38 via a seal (such as an O-ring) 54, wherein the seal 54 is located within a seal groove 56 and held in place with a retaining plate 58. The seal 54 functions to isolate the second piston chamber 46 from the flow path 14.

As illustrated in FIG. 3, a first control line 60 is arranged to permit fluid pressure (e.g., hydraulic or pneumatic) to be delivered to the first piston chamber 42 and thus apply a pressure over the piston area defined by the first piston head 40, biasing the valve member 26 to move in the direction of arrow 62 (i.e., a valve open direction). Similarly, a second control line 64 is arranged to permit fluid pressure to be delivered to the second piston chamber 46 and thus apply a pressure over the piston area defined by the second piston head 44, biasing the valve member 26 to move in the direction of arrow 66 (i.e., a valve open direction).

Fluid pressure may be provided via a suitable pressure source, such as a pump, accumulator, ambient environment etc. In some examples a common pressure source may be utilised to communicate via both the first and second control lines 60, 64. Alternatively, separate pressure sources may be provided.

Thus, control of fluid pressure applied to the first and second piston chambers 42, 46 via the first and second control lines 60, 64 may facilitate desired movement or stroking of the valve member 26. For example, to configure the valve in the open configuration of FIGS. 2 and 3, pressurised fluid is delivered to the first piston chamber 42 via the first control line 60, while fluid within the second piston chamber 46 is vented via second control line 64.

Figure 4:
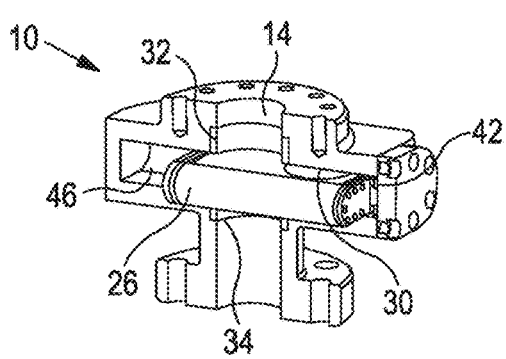
FIGS. 4 and 5 provide sectional views of the valve apparatus of FIG. 1 in a closed configuration.
Figure 5:
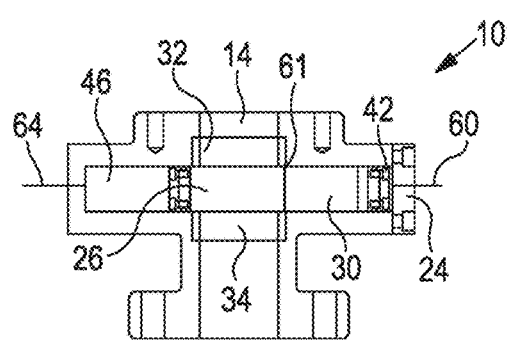

When the valve member 26 is to be moved to its closed position, as illustrated in FIGS. 4 and 5, pressurised fluid is delivered to the second piston chamber 46 via control line 64, while fluid within the first piston chamber 42 is vented via first control line 60. When in this closed position the through hole 30 of the valve member 26 is misaligned from the flow path 14, with the valve seats 32, 34 providing sealing against opposing solid surfaces of the valve member 26. In some examples, the valve member 26 may be mounted within the valve 10 with a degree of compliance, such that the valve member 26 may be moved in accordance with a retained pressure differential. Such a compliant mounting may permit the valve member 26 to be preferentially pressed against one of the valve seats 32, 34 in accordance with the direction of the pressure differential applied, thus assisting to improve sealing integrity.

In the present example a valve seat 32, 34 is located on opposite sides of the valve member 26. However, in other examples only a single valve seat may be provided, which might be the case for applications where the valve 10 is used to retain a pressure differential in a single direction.

As described above, the valve member 26 is moveable in response to pressures within the first and second piston chambers 42, 46. As such, the valve member 26 may function as a piston member. In this respect the valve member 26 may form part of an internal fluid actuator assembly. This arrangement may minimise complexities associated with providing entirely separate actuator components for use in operating the valve member. Further, this arrangement may potentially permit larger actuation forces to be achieved for a given operating pressure, in that the entire sectional area of the valve member may be used to define respective piston areas.

In the example illustrated in FIGS. 2 to 5, the valve member 26 is non-round in lateral cross-section. In this respect the cross-sectional shape may be defined in a transverse or lateral plane through the valve member 26, wherein such a transverse or lateral plane may be transverse or lateral relative to a direction of movement or stroking of the valve member 26.

For example, the valve member 26 may be generally elongate in lateral cross-section. Such elongation may be such that a width of the valve member 26 is greater than a height in the same lateral plane. In this respect the valve member 26 may be arranged within the valve apparatus 10 such that the width of the elongated lateral cross section is aligned transverse to the flow path 14, whereas the height of the elongated lateral cross section is generally aligned, for example parallel to, the flow path 14. Thus, the elongated cross-sectional shape may permit the width of the valve member 26 to provide sufficient occlusion to the flow path 14, while maintaining a compact design along the direction of the flow path 14. This arrangement may have multiple advantages, such providing a low profile valve, more readily allowing multiple valves or valve portions to be stacked axially along the direction of the flow path (for example to provide multiple barriers within the flow path), and/or the like.

In the present example the valve member may be considered to be generally oval in cross-section. The specific form of the valve member may be selected in accordance with user preference and/or the specific application. For example the valve member may define a continuously curved oval cross-sectional shape. This arrangement might assist any sealing integrity between the valve member 26 and the first and second piston bore 34, 38. In some examples the valve member may be generally stadium shaped in cross-section. The stadium shape may be formed by a substantially rectangular region with rounded, for example semi-circular, opposing sides.

The first and second piston bores 34, 38 in the present example compliment the shape of the valve member.

In some examples it might be desirable to facilitate a degree of valve maintenance without necessarily bringing the valve off-line. In one example, as illustrated in FIG. 5, when the valve member 26 is at the extreme of its stroke (in this case in its closed position), a static seal 61 may be established between the flow path 14 and the first piston chamber 42. When such a seal 61 is established, the cover plate or bonnet 24 may be removed, providing access to the first piston chamber. Such access may facilitate maintenance of seals or the like. In further examples a similar arrangement may be provided in the second piston chamber 46, for example with access also being achieved via a removable cover plate.

Figure 6:
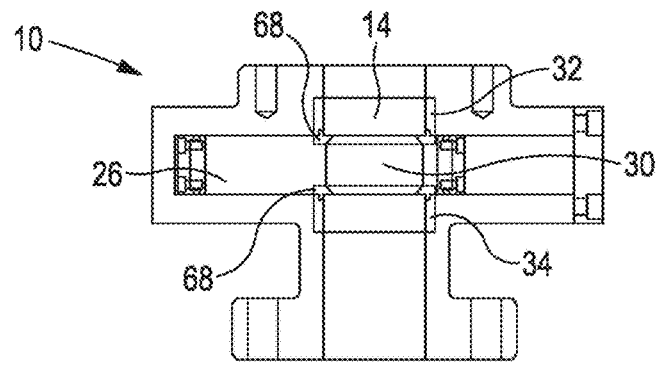
FIG. 6 provides a sectional view of an example valve apparatus with cutting capability.

In some examples, as illustrated in FIG. 6, the valve apparatus 10 may be operated to cut an object extending within the flow path 14. Such an object may comprise any object which might be present within the specific field of deployment of the valve apparatus. To provide an example, in the oil and gas industry the object may comprise wireline, slickline, coiled tubing, tool strings and/or the like. In this example the valve member 26 may comprise one or more cutting elements 68 around the through hole 30 of the valve member 26. Such cutting elements 68 may cooperate with the respective valve seats 32, 34 to facilitate cutting of an object within the flow path 14. It should be recognised that multiple other possible examples of cutting elements and arrangements may be utilised.

Figure 7:
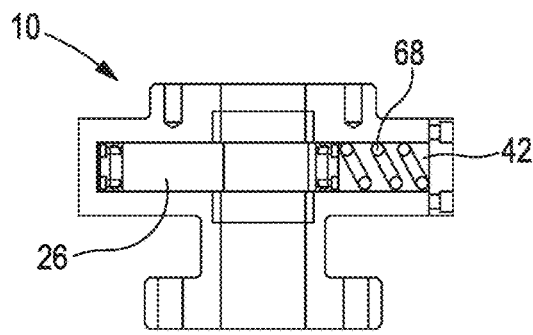
FIGS. 7 and 8 are sectional views of a modified form of the valve apparatus of FIG. 1, incorporating a biased valve member.

In some further examples, as illustrated in FIG. 7, the valve 10 may further include a biasing spring 68 within the first piston chamber 42 which acts to bias the valve member 26 towards the illustrated open position. In one variation the first piston chamber 42 may still be configured to receive fluid pressure, such that movement of the valve member 26 to its open position may be achieved via both the spring bias force and the pressure force. In an alternative variation, fluid pressure may not be applied within the first piston chamber 42, such that the valve member 26 may be moved towards its open position by the bias force of the spring 68 only.

Figure 8:
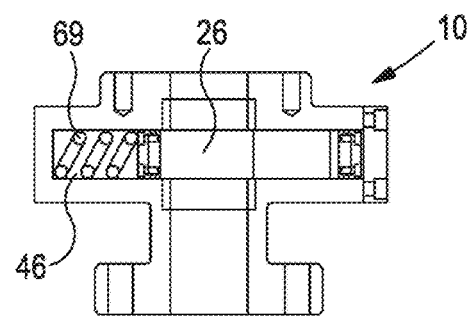

An alternative example is illustrated in FIG. 8, in which a bias spring 69 is located within the second piston chamber 46 which acts to bias the valve member 26 towards the illustrated closed position. In one variation the second piston chamber 46 may still be configured to receive fluid pressure, such that movement of the valve member 26 to its closed position may be achieved via both the spring bias force and the pressure force. In an alternative variation, fluid pressure may not be applied within the second piston chamber 46, such that the valve member 26 may be moved towards its closed position by the bias force of the spring 69 only.

In a further example, a bias spring may be provided in both the first and second piston chambers 42, 46, with one or both said chambers also receiving fluid pressure.

Figure 9:
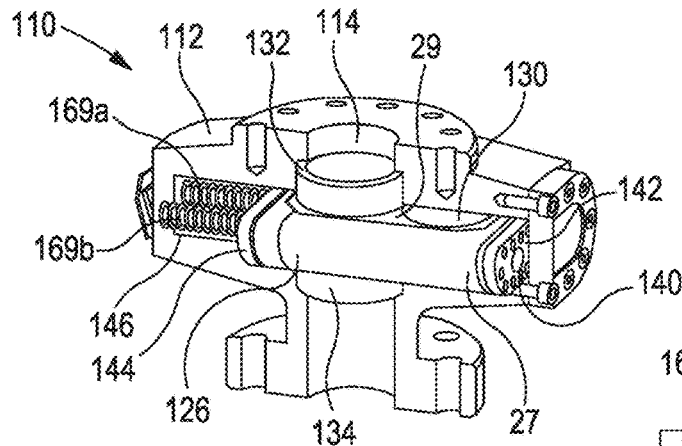
FIGS. 9 and 10 are sectional views of a further modified form of a valve apparatus.

An alternative valve apparatus, generally identified by reference numeral 110 is illustrated in FIG. 9 which is an isometric partial cross-sectional view of the valve apparatus 110. The valve apparatus 110 is similar in most respects to the apparatus 10 described above, and as such like features share like reference numerals, incremented by 100.

Thus, the valve apparatus 110 also includes a valve body 112 which defines a flow path 114, and a valve member 126 which is moveable within the valve 110 to selectively occlude the flow path 114, working in cooperation with valve seats 132, 134. In the present illustrated example the valve member 126 is in a closed position. The valve apparatus 110 also includes first and second piston chambers 142, 146, wherein a pair of biasing springs 169a, 169b are optionally mounted within the second piston chamber 146. Fluid pressure applied within the first piston chamber 142 acts to drive the valve member 126 in an opening direction, against the bias of the springs 169a, 169b. When fluid pressure is relieved form the first piston chamber 142 and fluid pressure provided in second piston chamber 146 the valve member 126 may be driven towards the illustrated closed position. In some examples the second piston chamber 142 may not receive fluid pressure, such that movement of the valve member 126 towards its closed position is achieved only by the bias springs 169a, 169b. In a further alternative example one or more biasing springs may be provided within the first piston chamber 142, and may operate with or without pressure applied within the first piston chamber.

In the present example the valve member is formed from multiple components, including a valve carriage 27 which defines first and second piston heads 140, 144 at opposing axial ends thereon. In this respect the valve carriage may function as a piston in the same manner described in relation to apparatus 10. The valve member 126 further comprises a valve body 29 mounted within and carried by the valve carriage 27, wherein a through hole 130 is formed within the valve body 29. The valve body 29 may be rigidly mounted within the valve carriage 27. Alternatively, the valve body 29 may be compliantly mounted within the valve carriage 27, such that the valve body may be moved, for example in accordance with a retained pressure differential, into our out of engagement with the respective valve seats 132, 134.

Figure 10:
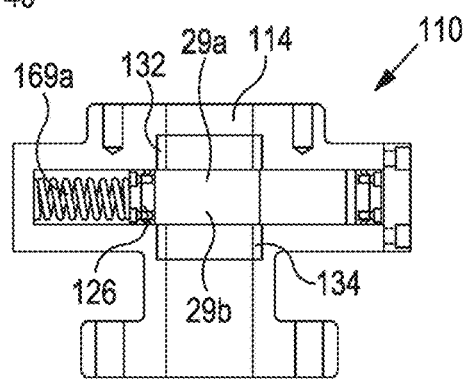

In an alternative arrangement, as illustrated in FIG. 10, which is a full cross-sectional view of the valve apparatus 110, the valve member 126 may comprise first and second valve bodies 29a, 29b mounted within the valve carriage 27. In this example the first and second valve bodies may be independently moveable in the axial direction, with respect to the flow path 114. In some examples the first and second valve bodies 29a, 29b may be independently moved into engagement with the respective valve seats 132, 134 during movement of the valve member 126 towards its closed position.

The valve apparatuses 10, 110 described above may be used in combination with any suitable fluid control system. For example, the fluid control system may include a pressure source, such as a pump, accumulator etc., control switches, valves and the like.

Figure 11:
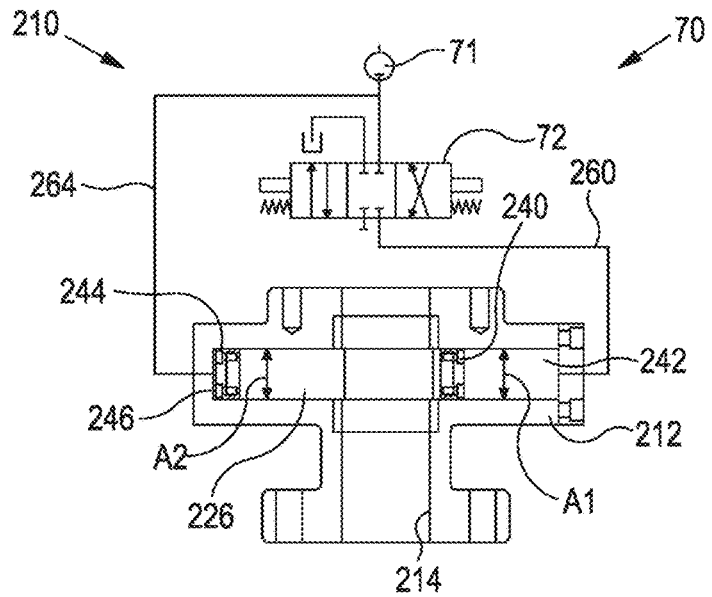
FIGS. 11 to 13 are sequential views of the operation of an alternative valve apparatus incorporating a differential piston arrangement and a regenerative hydraulic control arrangement.

Reference is now made to FIG. 11 which is a cross-sectional view of an alternative valve apparatus, in this case generally identified by reference numeral 210. The valve apparatus 210 is similar in most respects to the apparatus 10 described above, and as such like features share like reference numerals, incremented by 200.

Thus, the valve apparatus 210 also includes a valve body 212 which defines a flow path 214, and a valve member 226 which is moveable within the valve 210 to selectively occlude the flow path 214. In the present illustrated example the valve member 226 is in an open position. The valve apparatus 210 also includes first and second piston chambers 242, 246, wherein fluid pressure within the first piston chamber 242 acts over a first piston head 240 of the valve member 226, and fluid pressure within the second piston chamber 244 acts over a second piston head 244 of the valve member 226. In the present example, the first piston head 240 defines a first piston area A1 and the second piston head 244 defines a second piston area A2, wherein in the first piston area A1 is larger than the second piston area A2. This differential in piston area facilitates an exemplary fluid control protocol, which will now be described.

The valve apparatus 210 further comprises a fluid control system or arrangement 70, which in this example is a regenerative fluid control system. The control system 70 includes a pressure source, such as a pump 71, a first control line 260 which is in pressure communication with the first piston chamber 242, and a directional control valve 72 which is interconnected between the pump 71 and the first control line. The control system 70 further comprises a second control line 264 which facilitates direct pressure communication between the pump 71 and the second piston chamber 246.

When the directional control valve 70 is in its illustrated neutral position the pump 71 is isolated from the first control line, and fluid within the first piston chamber 242 and first control line 260 is hydraulically locked, thus preventing any movement of the valve member 226, even upon activation of the pump 71.

Figure 12:
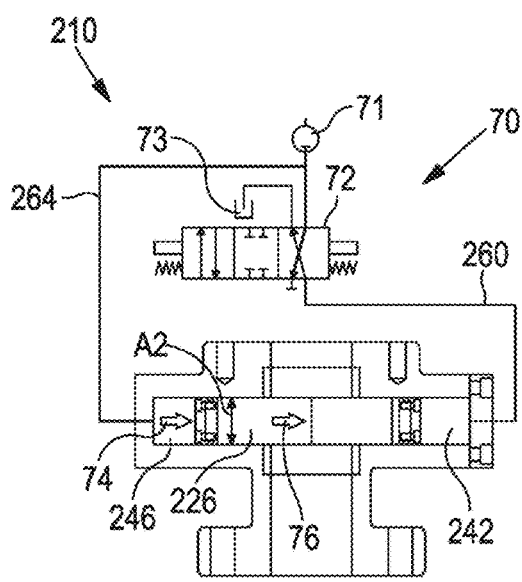

When the valve member 226 is to be moved towards its closed position, as illustrated in FIG. 12, the control system 70 may be configured in a first configuration in which the directional control valve 72 is positioned such that the first control line 260 is arranged in communication with a vent 73, and the pump 71 is activated such that pressure is applied within the second piston chamber 246 via the second control line. Fluid pressure within the second piston chamber 246 may therefore drive the piston member 226 towards its closed position, with fluid within the first piston chamber 242 being displaced towards the vent 73 via the first control line 260.

In some examples the vent 73 may be arranged at ambient pressure. In other examples the vent may comprise an accumulator, such that fluid displaced from the first piston chamber is used to at least partially charge the accumulator. The accumulator in this example might be used for contingency reasons, for example to provide operating pressure in the event of loss of the pump 71. In this respect, the accumulator may provide fluid pressure to operate the valve in a desired mode of operation (which might be considered a failure mode of operation). In one example, the accumulator may provide operating pressure to the second piston chamber 246 to provide a fail-closed mode of operation. It should be recognised that any example valve apparatus as disclosed herein may also be provided in combination with an accumulator. That is, the use of an accumulator is not exclusively disclosed in combination with a regenerative-type fluid control system.

When in this first configuration the driving force applied on the valve member 226 may be considered to be a function primarily of the pressure from the pump 71 acting over the second piston area A2. In FIG. 12 the white arrow 74 represents the magnitude and direction of the force applied on the valve member 226.

Further, movement of the valve member towards its closed position will be accompanied by an increase in volume of the second piston chamber 246, and a decrease in volume of the first piston chamber 242. However, as the first piston chamber 242 is in communication with the vent 73, the fluid displaced from the first piston chamber 242 does not form part of a high pressure circuit driven by the pump 71. The speed of operation of the valve member 226 may thus be a function of the rate at which the second piston chamber 246 may be filled with an operating fluid driven exclusively via the second control line 264. In this respect, solid arrow 76 represents the magnitude of the driving force, and the speed and direction of movement of the valve member 226. That is, the direction of the solid arrow 76 reflects the direction of movement, the width of the solid arrow reflects the magnitude of force, and the length of the solid arrow reflect the speed of movement.

Figure 13:
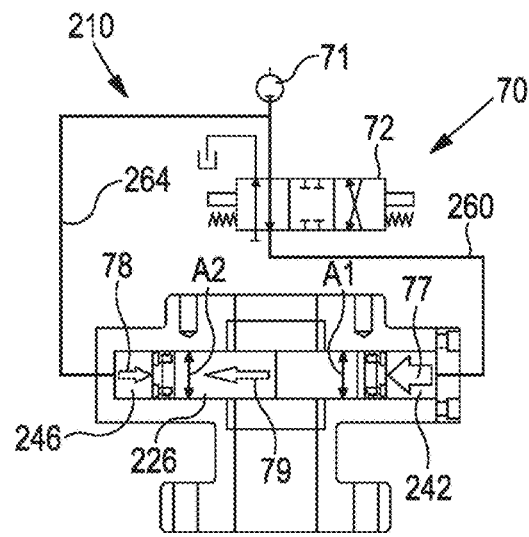

When the valve member 226 is to be moved towards its open position, as illustrated in FIG. 13, the control system 70 may be configured in a second configuration in which the directional control valve 72 is positioned such that the first control line 260 is arranged in pressure communication with the pump 71, thus permitting pressure derived from the pump 71 to be delivered to the first piston chamber 242. This pressure may be applied over the first piston area A1, thus applying a bias force represented by white arrow 77. Pressure will also be delivered to the second piston chamber 246 via the second control line 264 and thus applied over the second piston area A2, thus applying a bias force represented by white arrow 78. When in this second configuration the driving force applied on the valve member 226 may be considered to be a function primarily of the pressure from the pump 71 acting over the differential between the first and second piston areas A1, A2. As the first piston area A1 is larger than the second piston area A2, the valve member 226 will be caused to move in the direction of solid arrow 79. Depending on the magnitude of the differential area, the driving force may be less than that achievable when the fluid control system 70 is in its first configuration.

Movement of the valve member 226 towards its open position will be accompanied by an increase in volume of the first piston chamber 242, and a decrease in volume of the second piston chamber 246. As both the first and second piston chambers 242, 246 are in communication with the pump 71, fluid displaced form the second piston chamber 246 will remain within the pressurised circuit driven by the pump 71. As such, a more rapid operation of the valve member 226 may be achievable when the fluid control system 70 is in its second configuration. However, in return for this more rapid movement, force is compromised by virtue of the resistance applied by fluid pressure within the second piston chamber 246. In this respect, solid arrow 79 represents the magnitude of the resultant driving force, and the speed and direction of movement of the valve member 226. That is, the direction of the solid arrow 79 reflects the direction of movement, the width of the solid arrow reflects the magnitude of force, and the length of the solid arrow reflect the speed of movement.

In the specific example provided, the valve member 226 is operated to move with higher force and at a slower speed towards its closed position, and with a lower force and a higher speed towards its open position. This arrangement might suit particular operational requirements, for example where a cutting force may be necessary when the valve member 226 is moved towards its closed position. However, in other examples it might be preferable to be capable of applying a larger force in the opening direction, or indeed apply a variable force in one direction, such as a closing direction. Such an alternative control will now be described, initially with reference to FIG. 14.

Figure 14:
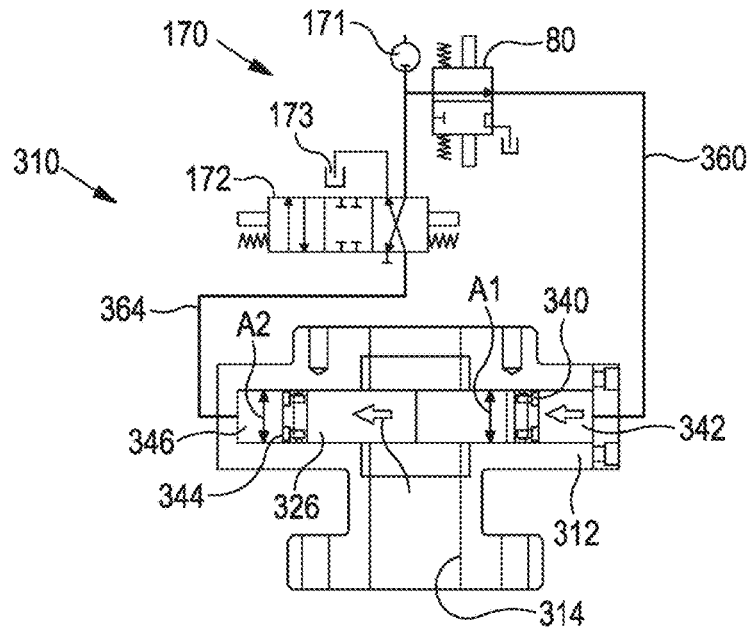
FIGS. 14 to 16 are sequential views of the operation of a further alternative valve apparatus incorporating a differential piston arrangement and a regenerative hydraulic control arrangement.

In this respect FIG. 14 provides a cross-sectional view of an alternative valve apparatus, in this case generally identified by reference numeral 310. The valve apparatus 310 is similar in most respects to the apparatus 210 described above, and as such like features share like reference numerals, incremented by 100.

Thus, the valve apparatus 310 also includes a valve body 312 which defines a flow path 314, and a valve member 326 which is moveable within the valve 310 to selectively occlude the flow path 314. The valve apparatus 310 also includes first and second piston chambers 342, 346, wherein fluid pressure within the first piston chamber 342 acts over a first piston head 340 of the valve member 326, and fluid pressure within the second piston chamber 344 acts over a second piston head 344 of the valve member 326. In the present example, the first piston head 340 defines a first piston area A1 and the second piston head 344 defines a second piston area A2, wherein in the first piston area A1 in this example is smaller than the second piston area A2. This differential in piston area facilitates an exemplary fluid control protocol, which will now be described.

The valve apparatus 310 further comprises a fluid control system or arrangement 170, which in this example is a regenerative fluid control system. The control system 170 includes a pressure source, such as a pump 171, a first control line 360 which is in pressure communication with the first piston chamber 342, and a second control line 364 which is in pressure communication with the second piston chamber 342. The control system further comprises a directional control valve 172 which is interconnected between the pump 171 and the second control line 364. A secondary control valve 80 is provided which is interconnected between the pump 171 and the first control line 360.

The control system 170 is illustrated in FIG. 14 in a first configuration, in which the pump 171 is operational and the directional control valve 172 is positioned such that the second piston chamber is in communication with a vent 173. Further, the secondary control valve 80 is positioned such that the first control line and thus first piston chamber 242 is in pressure communication with the pump 171.

When in this first configuration the driving force applied on the valve member 326 may be considered to be a function primarily of the pressure from the pump 171 acting over the first piston area A1, thus causing the valve member 326 to move in the direction of solid arrow 176. As fluid displaced from the second piston chamber 346 is vented and thus not retained within the pressurised circuit driven by the pump 171, the speed of movement will thus be dictated by the rate at which the pump 171 alone can deliver fluid to the first piston chamber 342.

Figure 15:
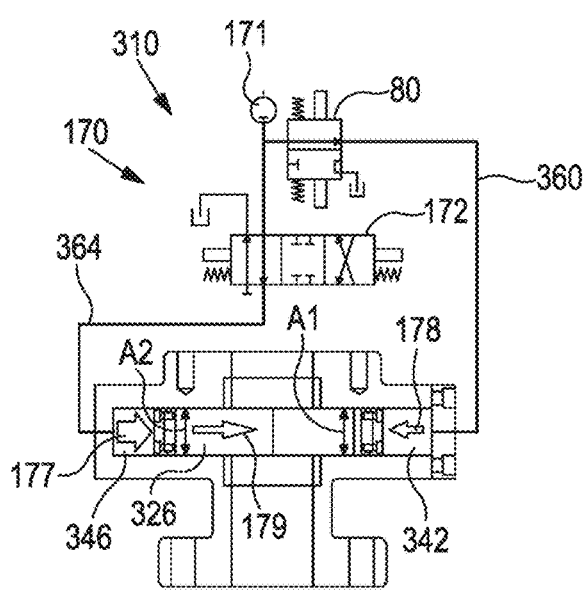

When the valve member 326 is to be moved towards its open position, as illustrated in FIG. 15, the control system 170 may be configured in a second configuration in which the directional control valve 172 is positioned such that the second control line 364 is arranged in pressure communication with the pump 171, thus permitting pressure derived from the pump 171 to be delivered to the second piston chamber 346. This pressure may be applied over the second piston area A2, thus applying a bias force represented by white arrow 177. The secondary valve 80 remains in its original position and as such pressure will also be delivered to the first piston chamber 342 via the first control line 360 and thus applied over the smaller first piston area A1, thus applying a bias force represented by white arrow 178. When in this second configuration the driving force applied on the valve member 326 may be considered to be a function primarily of the pressure from the pump 71 acting over the differential between the first and second piston areas A1, A2. As the first piston area A1 is smaller than the second piston area A2, the valve member 326 will be caused to move in the direction of solid arrow 179. Depending on the magnitude of the differential area, the driving force may be less than that achievable when the fluid control system 170 is in its first configuration.

As in the previous example, fluid displaced form the first piston chamber 342 will remain within the pressurised circuit driven by the pump 171 and as such a more rapid operation of the valve member 326 may be achievable when the fluid control system 170 is in its second configuration. However, in return for this more rapid movement, force is compromised by virtue of the resistance applied by fluid pressure within the first piston chamber 342. In this respect, solid arrow 179 represents the magnitude of the resultant driving force, and the speed and direction of movement of the valve member 326. That is, the direction of the solid arrow 179 reflects the direction of movement, the width of the solid arrow reflects the magnitude of force, and the length of the solid arrow reflect the speed of movement.

Figure 16:
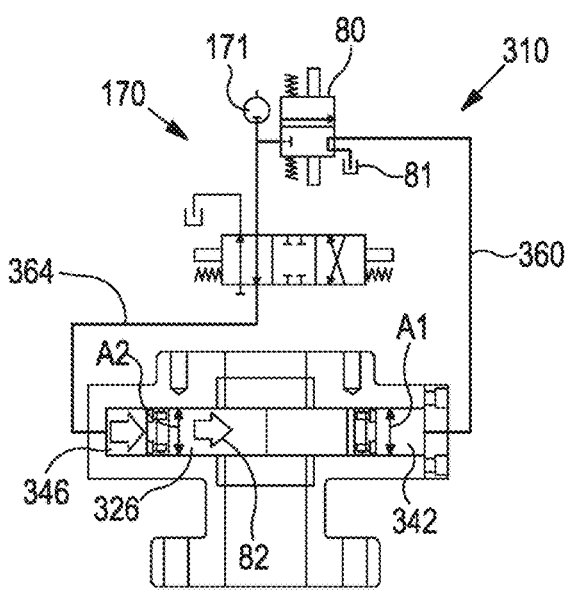

In some circumstances this low force/high speed combination may be acceptable during movement of the valve member 326, in this case towards its closed position. However, in some cases it may be desirable after a first phase of movement of the valve member 326 to provide a larger driving force. This may be accommodated within the present example by reconfiguring the control system 170 into a third configuration, as illustrated in FIG. 16. In this respect, when it is recognised that a higher driving force is required (autonomously by sensed parameters and/or based on operator control) the secondary control valve 80 may be moved such that the first piston chamber 342 is in communication with a vent 81. In this configuration the pressure derived from the pump 171 will no longer provide any resistance within the first piston chamber, thus allowing the valve 326 to be moved under a larger driving force. As the fluid displaced from the first piston chamber 342 no longer forms part of the high pressure circuit driven by the pump 171, the rate of movement of the valve member 326 will be reduced, assuming of course that the flow rate from the pump remains constant. Solid arrow 82 diagrammatically illustrates the magnitude of the driving force, and the speed and direction of movement.

It should be recognised that the various valve control examples described above may be arranged such that the defined control is provided with reverse movement of the valve member. For example, in the arrangements described above, the first and second control lines may be switched between the piston chambers.

Figure 17:
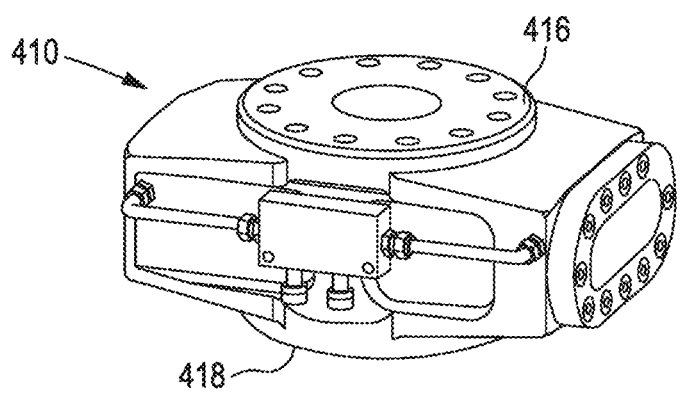
FIGS. 17 to 19 provide alternative examples of valve apparatus.

In the examples illustrated above the valve apparatus includes different flange connections (for example flanges 16, 18 in FIG. 1). However, in other examples different flange connections, or a mix of flange connections may be provided. For example, in FIG. 17 an example valve apparatus 410 is illustrated which includes opposing low profile or blind flanges 416, 418. Such an arrangement may provide an extremely compact design. Further, such an arrangement may assist to offset any height increase which could be required in the use of suitable cross-over connections, for example to facilitate connection to a Xmas tree or the like.

Figure 18:
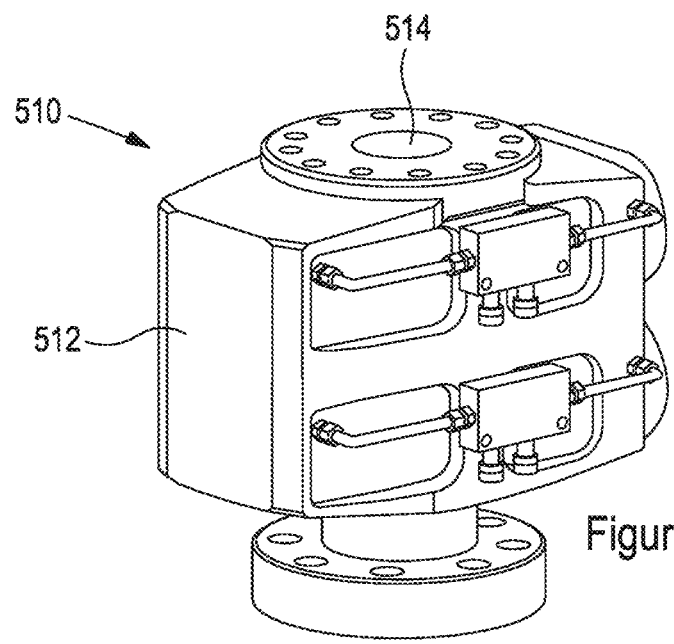

In the examples provided above a single valve member is provided. However, in other examples, as illustrated in FIG. 18, a valve apparatus 510 may be provided in which multiple valve members are provided axially along a flow path, in an axial stacked configuration. Such axial stacking may be achieved while still minimising the dimension of a valve body 512 in the axial direction by virtue of the flattened or elongate form of the valve members, and of the compactness of the internal or integrated valve actuator.

Figure 19:
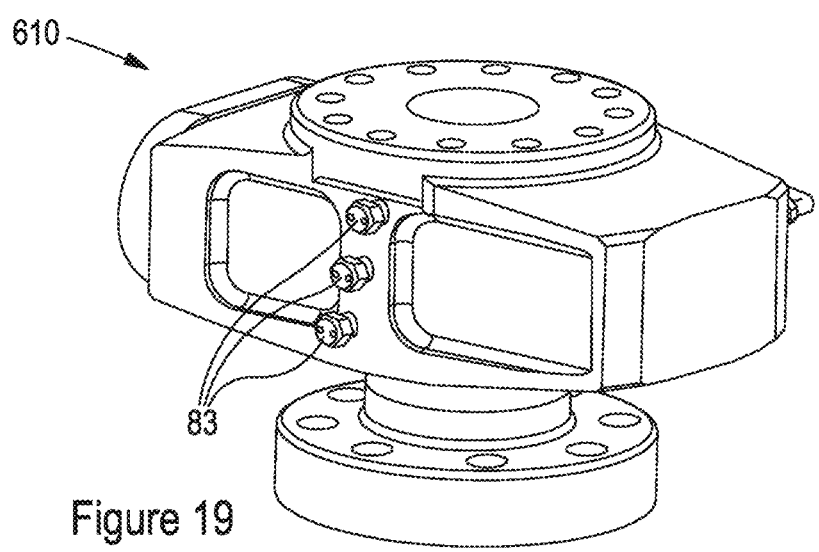

In some or all of the examples described above a means of injecting a material, such as a sealant, lubricant etc. into the valve apparatus may be provided. For example, in a valve apparatus 610 illustrated in FIG. 19, one or more injection ports 83 may be provided. Injection may be desired to an internal target region such as around sealed areas, in the region of valve seats etc.

Figure 20:
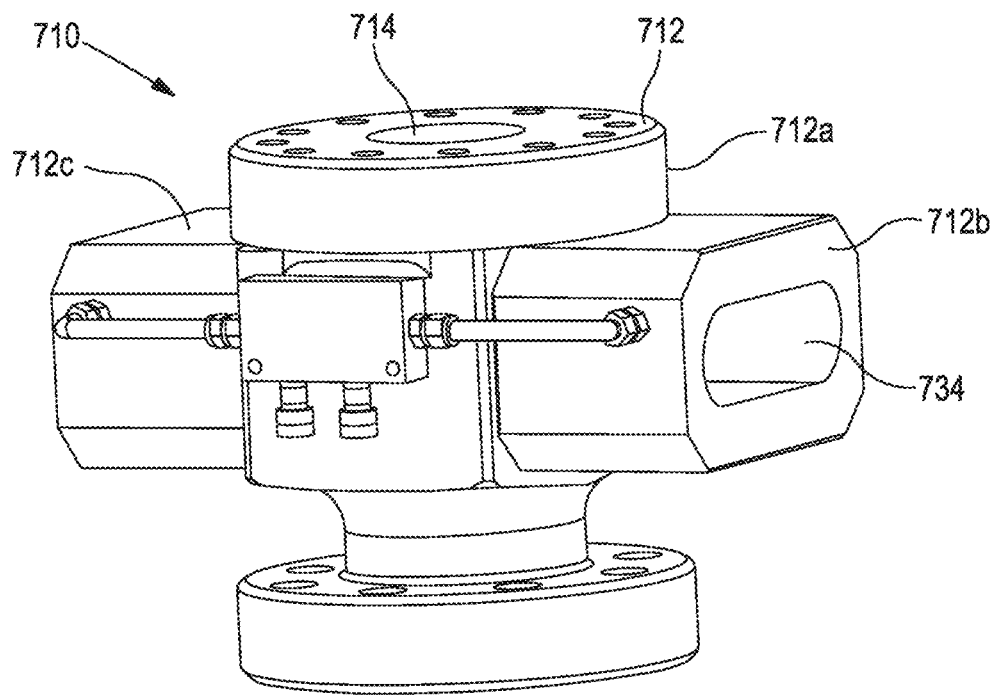
FIG. 20 illustrates an alternative valve apparatus.

In the examples described above the valve body defines the piston bores therein. In this respect an integral valve body is provided which defines both the flow path and the piston bores. However, in an alternative example, as illustrated in FIG. 20, a modular valve apparatus 710 may be provided. In this respect, the valve body 712 may comprise a central portion 712a through which a flow path 714 extends, and first and second wing modules 712b, 712c fixed, for example via bolting, welding etc. to the central portion 712a. Each wing portion may define a piston bore therein. For example, FIG. 20 illustrates a first piston bore 734 formed within the first wing module 712b. This arrangement may facilitate a more preferential or easier method of manufacture and perhaps also allow easier repair. It may also allow certain advantages such as being able to more readily adjust piston areas on each side and therefore the dynamics of the valve (for example providing balanced piston areas, differential piston areas and the like). In this example, benefits may be derived where the valve member provides a static seal at the end of its stroke (for example static seal 61 illustrated in FIG. 5). This may allow intervention of the wing portion and associate components without necessarily bringing the valve 710 offline.

Figure 21:
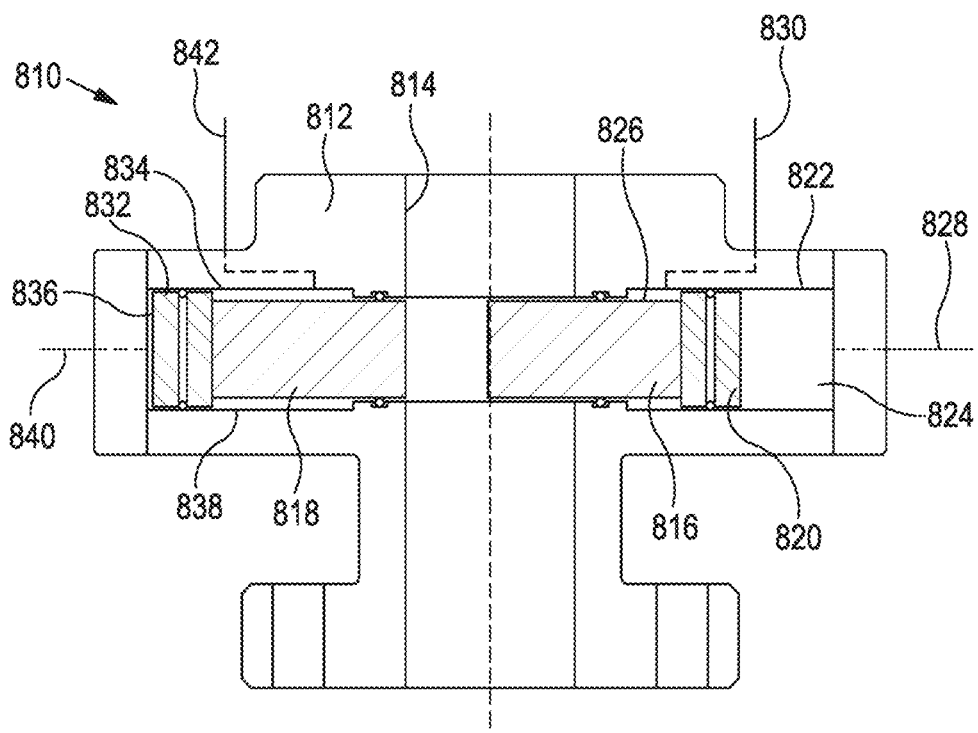
FIG. 21 provides a sectional view of a valve apparatus which may be used in a Blow Our Preventer (BOP)

In the examples provided above the various valves include gate valve members. However, the principles of the present disclosure may extend to other valve types, such as ram valves. In this respect a cross-sectional view of a further example of a valve apparatus, generally identified by reference numeral 810, is illustrated in FIG. 21. In this example the valve apparatus 810 comprises a valve body 812 defining a flow path 814 therethrough. The valve 810 further comprises first and second ram valve members 816, 818 provided on opposite sides of the flow path 814 at the same axial location, and being operable to be extended and retracted to selectively occlude the flow path 814. In the present example, and for illustrative purposes, the first valve member 816 is illustrated in a fully extended (e.g., closed) position, and the second valve member 818 is illustrated in a fully retracted (e.g., open) position.

The first valve member 816 comprises a first piston head 820 located within a first piston bore 822, wherein the first piston head 820 divides the first piston bore 822 into first and second piston chambers 824, 826. Fluid pressure may be controlled within the first and second piston chambers 824, 826 via respective first and second control lines 828, 830 to cause desired movement of the first valve member 816. As such, the first valve member 816 may function as a piston member, and form part of a valve actuator. This may provide all the benefits of such an internal and integrated valve actuator as presented above.

The second valve member 818 may be configured similarly to the first valve member 816. Thus, the second valve member 818 comprises a second piston head 832 located within a second piston bore 834, wherein the first piston head 832 divides the first piston bore 834 into third and fourth piston chambers 836, 838. Fluid pressure may be controlled within the third and fourth piston chambers 836, 838 via respective third and fourth control lines 840, 842 to cause desired movement of the second valve member 818. As such, the second valve member 818 may also function as a piston member, and form part of a valve actuator.

The first and second valve members 816, 818 may cooperate to provide a desired function. For example the first and second valve members 816, 818, as illustrated, may define blind rams, configured to sealingly engage each other a seal the flow path 814. Alternatively, the first and second valve members 816, 818 may define shear rams, configured to shear or cut an object within the flow path 814. Alternatively further, the first and second valve members 816, 818 may define pipe rams, configured to sealingly engage an object, such as a slick joint, tubular etc., located within the flow path 814.

In some examples the valve apparatus 810 may provide functionality as a BOP. IN some examples multiple pairs of valve members may be provided along the length of the flow path 814. Also, the multiple valve member arrangement of FIG. 21 may be provided in combination with a gate valve member, such as described in one or more of the examples above.

In the examples provided above the various valve members also function as piston members of a valve actuator. However, alternative arrangements are possible. For example, a further example of a valve apparatus 910 is illustrated in FIGS. 22 and 23, wherein a partial cross-section isometric view is shown in FIG. 22, and a partial cross section top elevation view is shown in FIG. 23.

Figure 22:
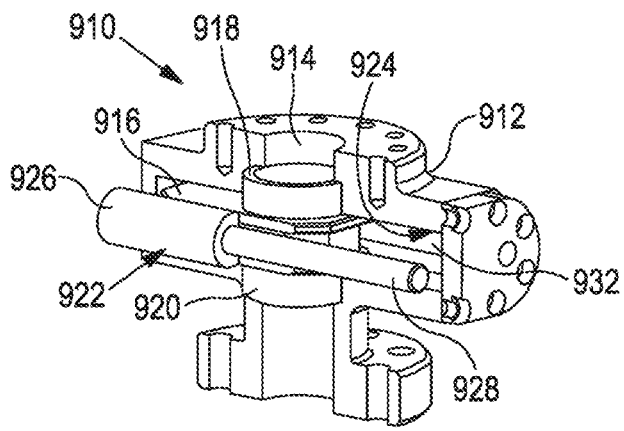
FIGS. 22 to 25 provide different views of an alternative valve apparatus in different configurations during use.
Figure 23:
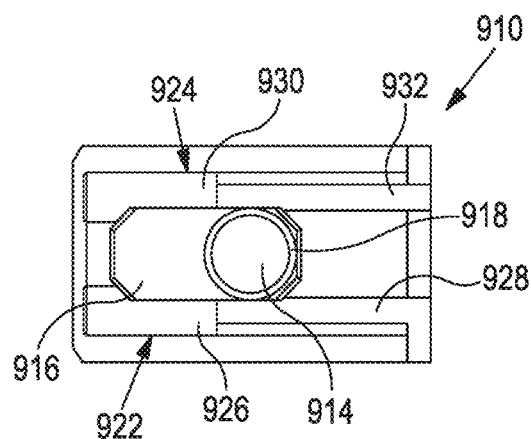

The valve apparatus 910 comprises a valve body 912 which defines a flow path 914 therethrough, and a gate valve member 916 which is operable to selectively occlude the flow path 914, wherein the valve member 916 is illustrated in its open position in FIGS. 22 and 23. The valve apparatus 910 further comprises first and second valve seats 918, 920 on opposite sides of the valve member 916, for use in engaging the valve member 916 at least when in its closed position to provide suitable sealing of the flow path 914.

The valve apparatus 910 further comprises first and second actuator assemblies 922, 924 provided internally within the valve body 912 and on opposite lateral sides of the valve member 916, for use in driving the valve member 916 between open and closed positions. The first actuator assembly 922 comprises a first piston cylinder 926 which is secured to the valve member 916, and a first piston member 928 which includes a first end which is fixed to the valve body 912 and a second end which extends into a first piston bore formed in the first piston cylinder 926. Although not illustrated, the second end of the first piston member 928 may include a piston head which divides the first piston bore into respective piston chambers.

The second actuator assembly 924 is of a similar construction to the first actuator assembly 922 and thus comprises a second piston cylinder 930 which is secured to the valve member 916, and a second piston member 932 which includes a first end which is fixed to the valve body 912 and a second end which extends into a second piston bore formed in the second piston cylinder 930. Although not illustrated, the second end of the second piston member may include a piston head which divides the second piston bore into respective piston chambers.

Figure 24:
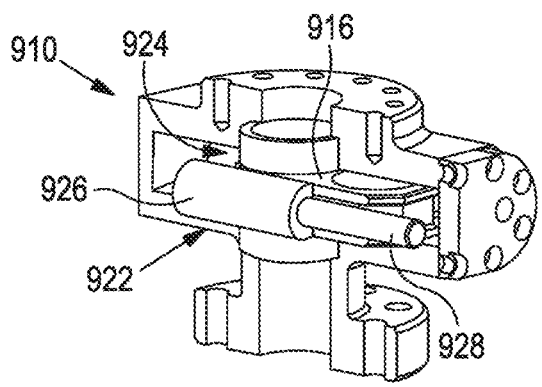
Figure 25:
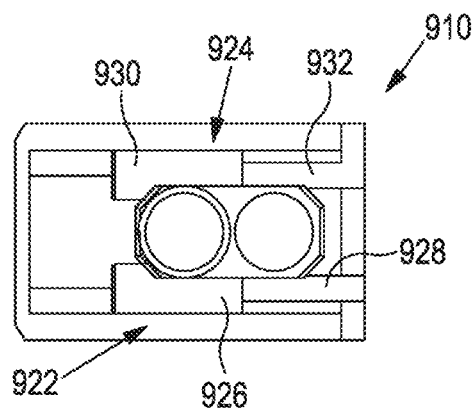

During operation of the first and second actuator assemblies 922, 924 to move the valve member 916 to its closed position, as illustrated in FIGS. 24 and 25, fluid pressure may be applied within the required piston chambers to establish a telescoping motion between the piston cylinders 926, 930 and the respective piston members 928, 932. Such telescoping movement will result in axial movement of the first and second piston cylinders 926, 930, which will in turn drive the valve member 916 to open. The actuator assemblies 922, 924 may also be configured to be pressure operated in a reverse direction, to thus return the valve member 916 to its open position. Alternatively, or additionally, an alternative actuation force, such as a spring bias force, may be provided to cause movement of the valve member in one or both directions.

Figure 26:
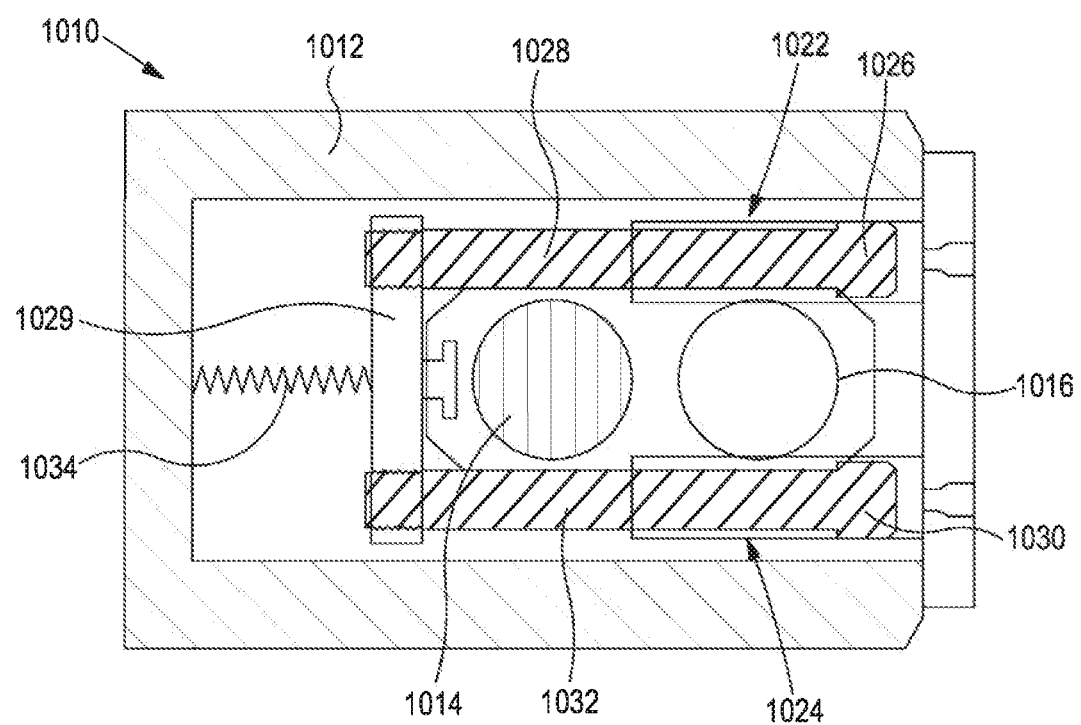
FIG. 26 diagrammatically illustrates a further alternative form of a valve apparatus.

In the example provided above, the piston cylinders are configured to be moved relative to the piston members which are fixed to the valve body. However, the reverse may be possible, as will now be described with reference to FIG. 26. In this respect FIG. 26 diagrammatically illustrates, in part cross-sectional elevation view, a valve apparatus 1010 which includes a valve body 1012 with a flow path 1014 extending therethrough. A gate valve member 1016 is mounted within the valve body 1012 and is operable to selectively occlude the flow path 1014, wherein the valve member 1016 is illustrated in its open position in FIG. 26.

The valve apparatus 1010 further comprises first and second actuator assemblies 1022, 1024 provided internally within the valve body 1012 and on opposite lateral sides of the valve member 1016, for use in driving the valve member 1016 between open and closed positions. The first actuator assembly 1022 comprises a first piston cylinder 1026 which is secured to the valve body 1012, and a first piston member 1028 which includes a first end which is fixed to the valve member 1016 via a connecting member 1029, and a second end which extends into a first piston bore formed in the first piston cylinder 1026. Although not illustrated, the second end of the first piston member 1028 may include a piston head which divides the first piston bore into respective piston chambers.

The second actuator assembly 1024 is of a similar construction to the first actuator assembly 1022 and thus comprises a second piston cylinder 1030 which is secured to the valve body 1012, and a second piston member 1032 which includes a first end which is fixed to the valve member 1016 via the connecting member 1029 and a second end which extends into a second piston bore formed in the second piston cylinder 1030. Although not illustrated, the second end of the second piston member 1032 may include a piston head which divides the second piston bore into respective piston chambers.

During operation of the first and second actuator assemblies 1022, 1024 to move the valve member 1016 to its closed position, fluid pressure may be applied within the required piston chambers to establish a telescoping motion between the piston cylinders 1026, 1030 and the respective piston members 1028, 1032. Such telescoping movement will result in axial movement of the first and second piston members 1028, 1032, which will in turn drive the valve member 1016 to open. The actuator assemblies 1022, 1024 may also be configured to be pressure operated in a reverse direction, to thus return the valve member 916 to its open position.

Alternatively, or additionally, an alternative actuation force, such as from a spring 1034, may be provided to cause movement of the valve member 1016 in one or both directions.

Figure 27:
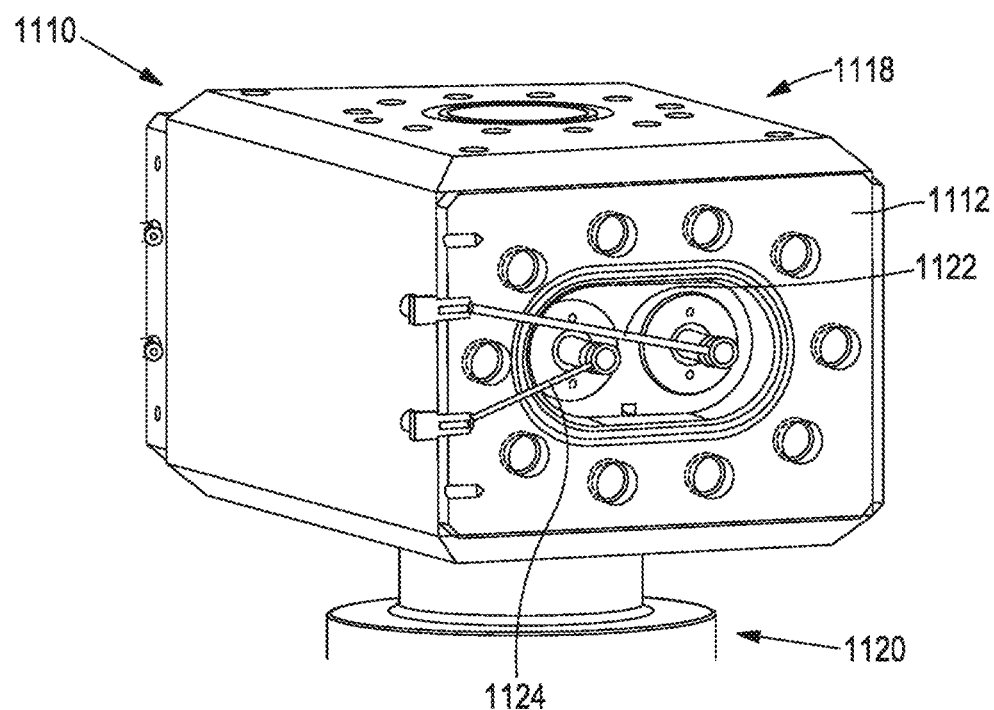
FIG. 27 illustrates an alternative valve apparatus.
Figure 28:
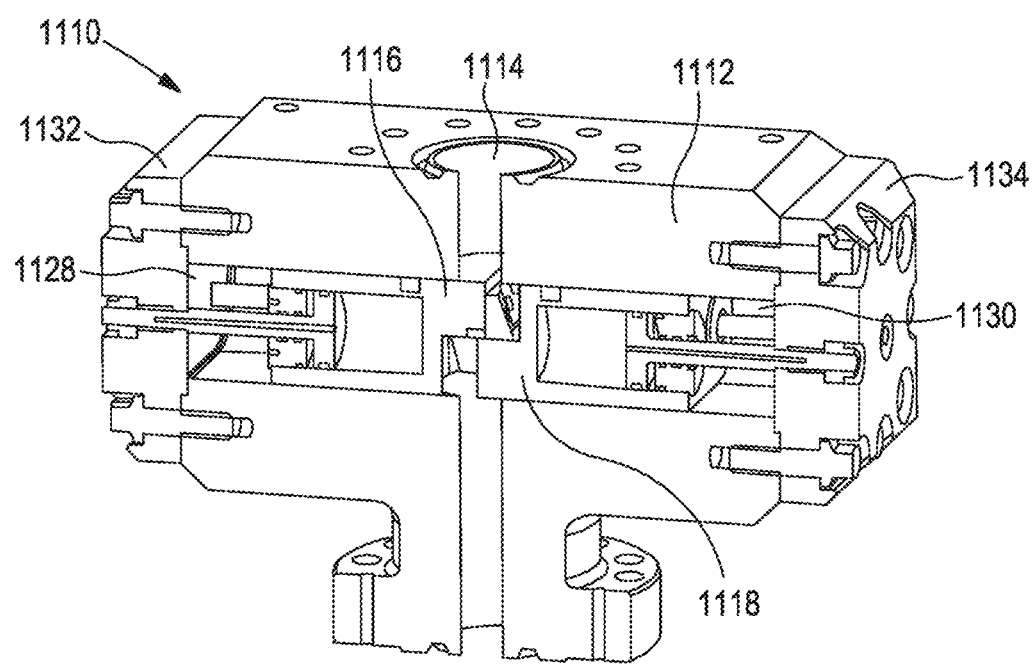
FIG. 28 provides a sectional perspective view of the valve apparatus of FIG. 27.

FIGS. 27 and 28 illustrate a further example of a valve apparatus, generally identified by reference numeral 1110, in perspective views, with FIG. 28 illustrating the valve apparatus 1110 in cross section. The valve apparatus 1110 comprises a valve body 1112 defining a flow path 1114 therethrough. In this example, a first connector 1118 at one end of the flow path 1114 comprises a series of holes formed on a surface of the valve body 1112 to accommodate a screwed connection with other infrastructure, and a second connector 1120 at the other end of the flow path 1114 comprises a necked flange construction including a plurality of bolt holes. It will be appreciated however that different flange types or different modes of connecting to other infrastructure may be provided here. The valve further comprises first and second valve members 1116, 1118 provided on opposite sides of the flow path 1114 at the same axial location, and being operable to be extended and retracted to selectively occlude the flow path 1114 by supply of fluid pressure from first and second control lines 1122, 1124, and third and fourth control lines (not shown), which are discussed in more detail below. The first and second valve members 1116, 1118 may define ram valve members, which in FIG. 28 are illustrated in a fully extended (e.g., closed) position.

The valve body 1112 comprises an internal valve cavity extending longitudinally through the valve body 1112 and across the flow path 1114, defining first and second internal valve spaces 1128, 1130 either side of the flow path 1114. The first ram valve member 1116 is received within the first space 1128 and the second ram valve member 1118 is received within the second space 1130. The first and second spaces 1128, 1130 of the internal valve cavity are provided with removable first and second cover plates or bonnets 1132, 1134, which are affixed to the valve body 1112 (e.g. by bolts) such that access to the internal valve cavity 1126 is permitted. In some examples the first and second valve members 1116, 1118 may be generally stadium shaped in cross-section. The stadium shape may be formed by a substantially rectangular region with rounded, for example semi-circular, opposing sides.

Figure 29:
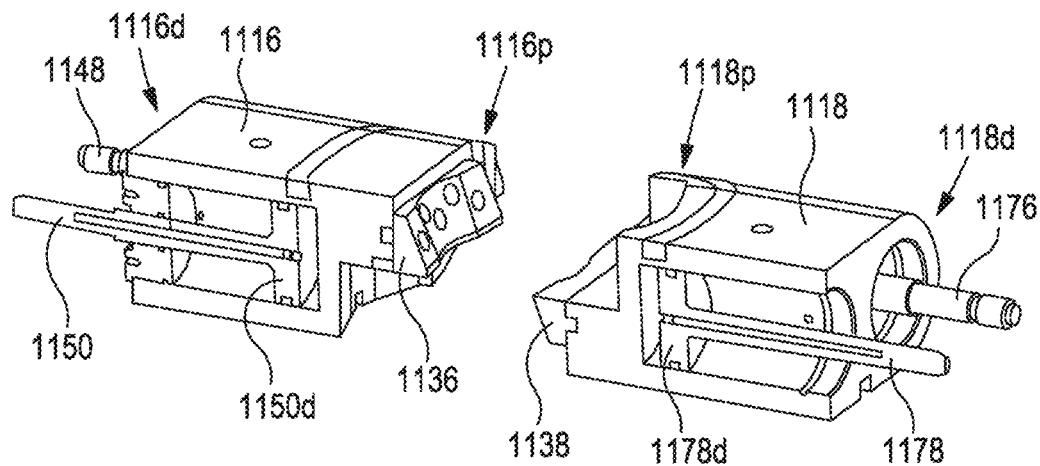
FIG. 29 illustrates exemplary valve members for use in the valve apparatus of FIG. 27.

Referring to FIG. 29, the first and second ram valve members 1116, 1118 each comprise a proximal section 1116p, 1118p and a distal section 1116d, 1118d, the proximal sections 1116p, 1118p being arranged closer to the flow path 1114 than the distal sections 1116d, 1118d. The proximal sections 1116p, 1118p are configured to receive or connect with respective inserts 1136, 1138 to selectively occlude the flow path 1114. In one example, the ram valve members 1116, 1118 may define blind rams, and thus the inserts may be configured to sealingly engage each other and seal the flow path 1114. Alternatively, the ram valve members 1116, 1118 may define pipe rams, and thus the inserts may be configured to sealingly engage an object, such as a slick joint, tubular etc., located within the flow path 1114. Alternatively further, the ram valve members 1116, 1118 may define shear rams, and thus the inserts may be configured to shear or cut an object within the flow path 1114. However it will be appreciated that the proximal sections 1116p 1118p of the ram valve members 1116, 1118 may be configured to perform these function itself without the need to connect with an insert. Alternatively, the ram valve members may be configured to connect with other components. For example, one of the ram valve members of the present example may be incorporated into the valve apparatus 10 of FIGS. 1-6, wherein instead of an insert, a gate valve member may be provided. In this example, the ram valve member may function purely as an actuator assembly configured to drive the gate valve member between extended and retracted positions.

Figure 30:
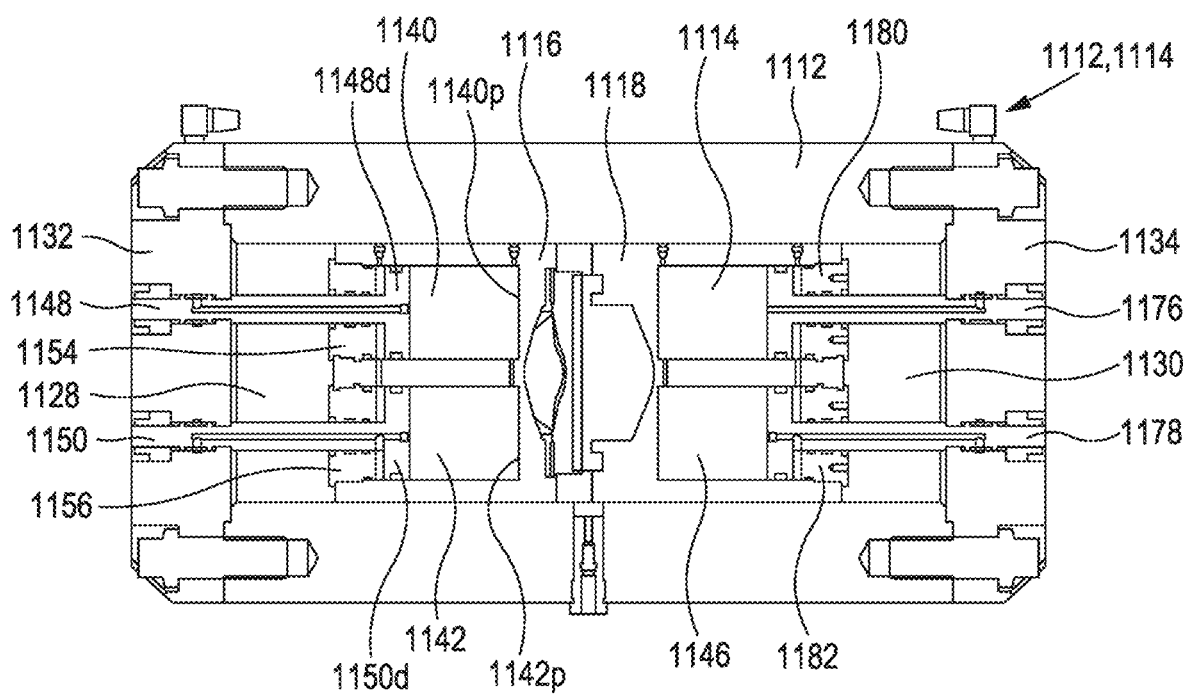
FIG. 30 provides a sectional plan view of the valve apparatus of FIG. 27.

Referring to FIG. 30, the distal section 1116d of the first ram valve member 1116 comprises first and second piston bores 1140, 1142 arranged adjacent to one another (i.e. in parallel) and having open (distal) ends configured to receive first and second piston members having piston rods 1148, 1150, respectively, and closed (proximal) ends defining cylinder head surfaces 1140p, 1142p. The first and second piston rods 1148, 1150 each have a first (distal) end affixed to the first bonnet 1132 (e.g. by bolts), wherein the bonnet 1132 itself is affixed to the valve body 1112, and a second (proximal) end received within the first and second piston bores 1140, 1142, respectively. In operation, the first and second piston members are fixed relative to the valve body 1112.

Figure 31:
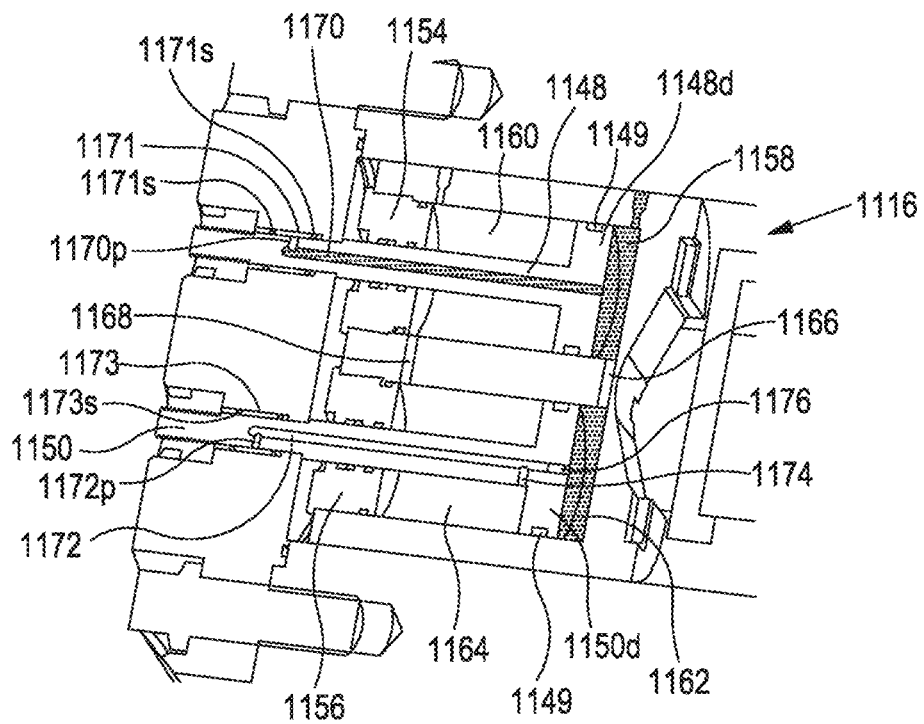
FIGS. 31 and 32 provide sectional perspective views of one of the valve members of FIG. 29.
Figure 32:
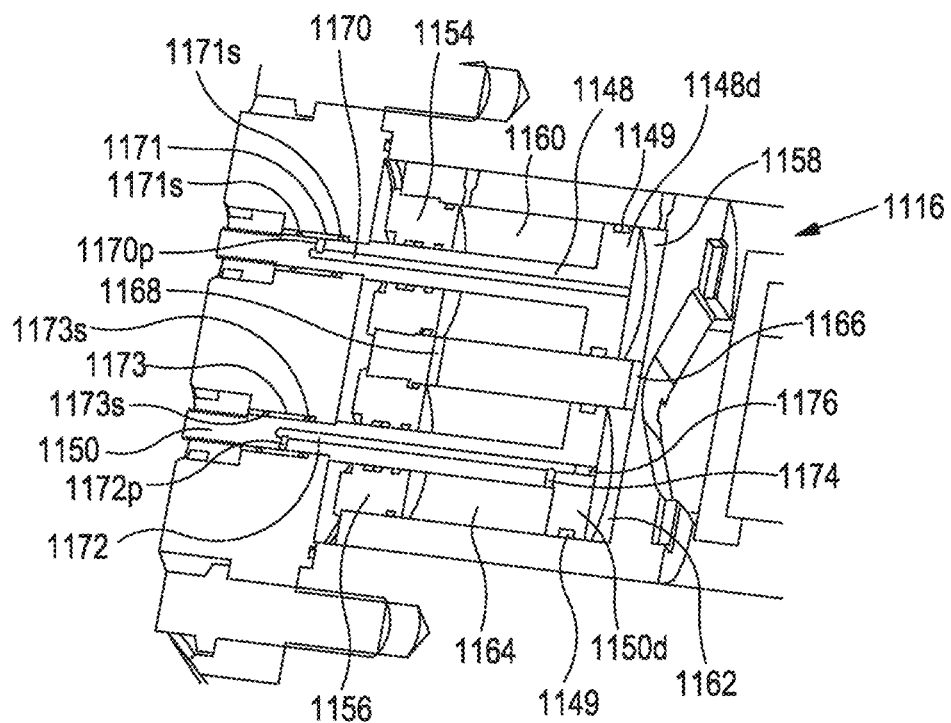

Referring to FIGS. 31 and 32, the proximal ends of the first and second piston members each comprise an enlarged piston head 1148d, 1150d of a size corresponding to that of the first and second piston bores 1140, 1142, thereby dividing the each of the piston bores 1140, 1142 into two piston chambers. Moreover, the open ends of the first and second piston bores 1140, 1142 are provided with cylinder end caps 1154, 1156, each having a central bore through which the first and second piston rods 1148, 1150 extend, respectively. In this example, the first and second cylinder end caps 1154, 1156 are provided as separate components sealingly engaged with the first and second piston bores 1140, 1142. In another example, the first ram valve member 1116 may define a single piston bore having an open end in which a piston member extends to define one or two piston chambers therein.

The piston head 1148d of the first piston member comprises a first (proximal) piston surface, which together with the first piston bore 1140 defines a first piston chamber 1158, and an opposing second (distal) piston surface, which together with the first piston bore 1140 and the first cylinder end cap 1154 define a second piston chamber 1160. Similarly, the piston head 1150d of the second piston member comprises a third (proximal) piston surface, which together with the second piston bore 1142 defines a third piston chamber 1162, and an opposing fourth (distal) piston surface, which together with the second piston bore 1142 and second cylinder end cap 1156 define a fourth piston chamber 1164. It will be appreciated that in this configuration the piston chambers are defined by the ram valve member 1116, therefore the ram valve member 1116 may be considered as a piston member forming an integral part of an internal actuator assembly, thereby providing for a compact valve design. Moreover, the provision of two piston bores 1140, 1142 defined by the ram valve member 1116 maximises the available piston area upon which fluid pressure may act, thereby increasing the force which may act on the ram valve member 1116 without increasing the height of the valve member 1116, thus further providing for a compact valve design. Furthermore, it will be appreciated that a greater force may act on the ram valve member 1116 when closing the flow path 1114 (i.e. moving the ram valve member 1116 to an extended position) than when opening the flow path 1114 (i.e. moving the first ram valve member 1116 to a retracted position), by virtue of the first and third piston chambers 1158, 1162 comprising a greater piston area than the second and fourth piston chambers 1160, 1164, which may provide certain advantages during operation of the valve apparatus 1110.

The first piston member includes a passageway comprising a gun drilled hole or a blind bore 1170 formed in a proximal end of the first piston member (i.e. starting from the piston head 1148*d*), permitting fluid communication between the first control line 1122 and the first piston chamber 1158. The passageway also includes a first side port 1170*p* connected to the blind bore 1170 and in fluid communication with a first hole 1171 formed in the first bonnet 1132. The first hole 1171 includes a first control line port (not shown) which fluidly connects to the first control line 1122. The first hole 1171 is configured to form an annular space between the first piston rod 1148 and the first hole 1171 such that fluid pressure fills the annular space when passing to and from the passageway 1170 of the first piston member. The provision of the annular space around the first piston rod 1148 means that the first side port 1170*p* need not be rotationally aligned with the control line port for fluid pressure to be delivered to the first piston chamber 1158, which may provide for an improved performance of the apparatus. The annular space is sealed at either end with seal members 1171*s* (e.g. O-rings).

Similar to the first piston member, the second piston member includes a passageway comprising a gun drilled hole or a blind bore 1172 formed in a proximal end of the second piston member, permitting fluid communication between the second control line 1124 and the fourth piston chamber 1164. The passageway also includes a second side port 1172*p* connected to the blind bore 1172 and in fluid communication with a second hole 1173 formed in the first bonnet 1132. The second hole 1173 includes a second control line port (not shown) which fluidly connects to the second control line 1122. The second hole 1173 is configured to form an annular space between the second piston rod 1150 and the second hole 1173, such that fluid pressure fills the annular space when passing to and from the passageway 1172 of the second piston member. The annular space is sealed with seal members 1173*s* (e.g. O-rings). In addition to the second side port 1172*p*, the second piston member further includes a third side port 1174 permitting fluid pressure to be delivered to the fourth piston chamber 1164.

Given that both the first and second piston members each comprise a passageway having a blind bore and a side port this may provide certain advantages in the manufacturing process of the piston members, that is a first stage of the manufacturing process may be the same for both piston members which may save on manufacturing costs and increase efficiency, with every second piston member undergoing a second stage of manufacture wherein the third side port is formed.

To prevent fluid pressure being delivered to the third piston chamber 1162 from the second control line 1124, the central passageway 1170 of the second piston member terminates in a plugged connection 1176. Moreover, the first and second piston heads 1148*d*, 1150*d* are provided with seals 1149 to prevent fluid communication between the first and second piston chambers 1158, 1160, and the third and fourth piston chambers 1162, 1164, respectively. The first and third piston chambers 1158, 1162 are configured in fluid communication with each other, and the second and fourth piston chambers 1160, 1164 are configured in fluid communication with each other, for example by first and second fluid channels 1166, 1168. Accordingly, fluid pressure delivered to the first piston chamber 1158 will pass through the first fluid channel 1166 into the third piston chamber 1162, and fluid pressure delivered to the fourth chamber 1164 will pass through the second fluid channel 1166 into the second chamber 1160. This may provide for a balanced force to act across the ram valve member 1116 while increasing the available piston area upon which pressure acts to drive the ram valve member 1116. Moreover, it will be appreciated that such a configuration may provide all the benefits of an internal and integrated valve actuator as presented above, being compact in nature while maximising the piston area available (and thus force) to drive the ram valve member for a given height of ram valve member.

The second ram valve member 1118 is configured similarly to the first valve member 1116, and therefore may provide the same benefits as the first ram valve member 1116. Moreover, for brevity, some features of the second valve member 1118 which are the same as in the first valve member 1116 have been omitted from the following description.

Referring back to FIGS. 29 and 30, the distal section 1118*d* of the second ram valve member 1118 comprises third and fourth piston bores 1144, 1146 arranged adjacent to one another (i.e. in parallel) and having an open (distal) end configured to receive third and fourth piston members having piston rods 1176, 1178, respectively, for operating the second ram valve member 1118. The third and fourth piston rods 1176, 1178 each have a first (distal) end affixed to the second bonnet 1134 (e.g. by bolts), wherein the bonnet 1134 itself is affixed to the valve body 1112, and a second (proximal) end received within the third and fourth piston bores 1144, 1146, respectively. As such, in operation the third and fourth piston members are fixed relative to the valve body 1112.

In the same way as the first and second piston rods members, the proximal ends of the third and fourth piston rods members each comprise an enlarged piston head of a size corresponding to that of the third and fourth piston bores 1176, 1178, respectively, thereby dividing each of the piston bores into two piston chambers. Moreover, the open ends of the third and fourth piston bores 1176, 1178 are provided with third and fourth cylinder end caps 1180, 1182, each having a central bore through which the third and fourth piston rods 1176, 1178 extend, respectively.

The piston head of the second piston member comprises a fifth (proximal) piston surface, which together with the third piston bore 1176 defines a fifth piston chamber, and an opposing sixth (distal) piston surface, which together with the third piston bore 1176 and the third cylinder end cap 1180 define a sixth piston chamber. Similarly, the piston head of the fourth piston rod comprises a seventh (proximal) piston surface, which together with the fourth piston bore 1178 defines a seventh piston chamber, and an opposing eighth (distal) piston surface, which together with the fourth piston bore 1178 and fourth cylinder end cap 1182 define an eighth piston chamber.

The third piston member includes a central passageway (e.g. a gun drilled hole or blind bore formed in a proximal end of the third piston member) permitting fluid communication between the third control line and the fifth piston chamber. The fourth piston member includes a central passageway (e.g. a gun drill drilled hole) and a side port permitting fluid communication between the fourth control line and the eighth piston chamber.

To prevent fluid pressure being delivered to the third piston chamber 1162 from the fourth control line, the central passageway of the fourth piston member terminates in a plugged connection. Moreover, the third and fourth piston heads are provided with seals to prevent fluid communication between the fifth and sixth piston chambers, and the seventh and eighth piston chambers, respectively. The fifth and seventh piston chambers are configured in fluid communication with each other, and the sixth and eighth piston chambers are configured in fluid communication with each other, for example by third and fourth fluid channels. Accordingly, fluid pressure delivered to the fifth piston chamber will pass through the third fluid channel into the seventh piston chamber, and fluid pressure delivered to the eighth piston chamber will pass through the fourth fluid channel into the sixth piston chamber.

In operation, when it is desired to close the flow path 1114 the first and second ram valves members 1116, 1118 are moved to an extended position. To do this, the first control line 1122 delivers fluid pressure to the first piston chamber 1158, which passes through the first fluid channel 1166 into the third piston chamber 1162 (as illustrated by the shading in FIG. 31 of the first ram valve member 1116), and the third control line delivers fluid pressure to the fifth piston chamber, which passes through the third fluid channel into the seventh piston chamber. This results in a force acting on the first ram valve member 1116 and an opposite force acting on the second ram valve member 1118 which biases the first and second ram valve members 1116, 1118 towards extended positions, thereby closing the flow path 1114. Conversely, when it is desired to open the flow path 1114 the first and second ram valves members 1116, 1118 are moved to a retracted position. To do this, the second control line 1124 delivers fluid pressure to the fourth piston chamber 1164, which passes through the second fluid channel 1168 into the second piston chamber 1160 (as illustrated by the shading in FIG. 32), and the fourth control line delivers fluid pressure to the eighth piston chamber, which passes through the fourth fluid channel into the sixth piston chamber. This results in a force acting on the first ram valve member 1116 and an opposite force acting on the second ram valve member 1118 which biases the first and second ram valve members 1116, 1118 towards retracted positions thereby opening the flow path 1114. As such, the valve apparatus 1110 may be operated in this way to selectively occlude the flow path 1114. In an alternative example, the first and/or second ram valve members may be provided with a biasing member configured to bias the first and/or second ram valve members in a direction towards or away from the flow path 1114, for example by the provision of a spring located between one of the ram valve members and their respective bonnets 1132, 1134.

The first ram valve member 1116 may be provided with an indicator member configured to indicate the position of one or both of the first ram valve members 1116 within the valve body 1112. For example, the indicator member may comprise a rod (not shown) fixed to a distal end of the first ram valve member 1116. The rod may extend through and protrude out of the first bonnet 1132 via a sealing package such that a position of the ram valve member 1116 is indicated.

The second ram valve 1118 member may also be provided with an indicator member of the same description.

The indicator members may function as a ram lockout assembly, allowing the ram valve members 1116, 1118 to be moved (e.g. manually) into a fully retracted or extended position. The indicator members may comprise a modular component configured to be mounted and/or demounted to the ram valve members as and when required. Additionally, it will be appreciated that when the ram valve members 1116, 1118 are in a fully extended position, the indicator members may be level with (and thus not protrude from) the first and/or second bonnets 1132, 1134 such that the indicator members are protected during movement of the valve apparatus 1110.

The invention claimed is:

1. A valve apparatus, comprising:
a valve body defining a flow path therethrough;
a valve member mounted within the valve body; and
an actuator assembly mounted internally within the valve body and comprising a first piston bore and piston member defining a piston chamber therebetween, wherein at least one of the first piston bore and piston member is engaged or associated with the valve member such that the valve member is moveable in accordance with fluid pressure within the piston chamber to selectively occlude the flow path,
wherein the first piston bore extends into and is located within the valve member, and the piston member extends into the first piston bore to define the piston chamber therein,
wherein the piston member is fixed with respect to the valve body and the valve member is moveable with respect to the piston member to selectively occlude the flow path.

2. The valve apparatus according to claim 1, wherein the piston chamber defines a first piston chamber, and wherein the piston member extends into the first piston bore to define a second piston chambers therein, wherein the first piston chamber is configured such that when supplied with fluid pressure the valve member is biased towards an extended configuration, and the second piston chamber is configured such that when supplied with fluid pressure the valve member is biased towards a retracted configuration, to selectively occlude the flow path.

3. The valve apparatus according to claim 2, wherein the valve member defines a second piston bore arranged in parallel with the first piston bore, and wherein a second piston member extends into the second piston bore to define a third piston chamber therein.

4. The valve apparatus according to claim 3, wherein the second piston member is fixed with respect to the valve body and the valve member is moveable with respect to the second piston member.

5. The valve apparatus according to claim 3, wherein the second piston member extends into the second piston bore to define a fourth piston chambers therein, wherein the third piston chamber is configured such that when supplied with fluid pressure the valve member is biased towards an extended configuration, and the fourth piston chamber is configured such that when supplied with fluid pressure the valve member is biased towards a retracted configuration, to selectively occlude the flow path.

6. The valve apparatus according to claim 5, wherein the first and third piston chambers are in fluid communication.

7. The valve apparatus according to claim 5, wherein the second and fourth piston chambers are in fluid communication.

8. The valve apparatus according to claim 1, comprising a second valve member arranged on an opposite side of the flow path to the valve member at the same axial location.

9. The valve apparatus according to claim 1, wherein the valve member is generally elongate in lateral cross-section.

10. The valve apparatus according to claim 1, wherein the actuator assembly is configured to move the valve member in at least one of first and second opposite directions.

11. The valve apparatus according to claim 10, wherein the piston chamber defines a first piston chamber and the actuator assembly further comprises a second piston chamber, wherein fluid pressure within the first piston chamber biases the valve member to move in the first direction, and fluid pressure within the second piston chamber biases the valve member to move in the second direction, such that control of the fluid pressures within the first and second piston chambers provides desired control of movement of the valve member.

12. The valve apparatus according to claim 1, further comprising a regenerative fluid control arrangement configurable between a first configuration in which the valve member is operated to move in a first direction, and a second configuration in which the valve member is operated to move in a reverse second direction.

13. The valve apparatus according to claim 1, comprising at least two valve members provided on opposite sides of the flow path.

14. A method for providing selective occlusion to a flow path, comprising applying operating pressure to a piston chamber defined between a piston bore and a piston member of an actuator assembly mounted within a valve body which defines a flow path therethrough, wherein at least one of the piston bore and piston member is engaged or associated with a valve member mounted within the valve body such that the valve member is moveable in accordance with the operating pressure within the piston chamber to selectively occlude the flow path, wherein the piston bore extends into and is located within the valve member, and the piston member extends into the piston bore to define the piston chamber therein, wherein the piston member is fixed with respect to the valve body and the valve member is moveable with respect to the piston member to selectively occlude the flow path.

* * * * *